United States Patent
Takaku

(10) Patent No.: US 9,889,693 B2
(45) Date of Patent: Feb. 13, 2018

(54) INKJET RECORDING METHOD AND INKJET RECORDING APPARATUS

(71) Applicant: Konica Minolta, Inc., Chiyoda-ku, Tokyo (JP)

(72) Inventor: Yusuke Takaku, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 15/302,329

(22) PCT Filed: Apr. 8, 2015

(86) PCT No.: PCT/JP2015/061004
§ 371 (c)(1),
(2) Date: Oct. 6, 2016

(87) PCT Pub. No.: WO2015/156326
PCT Pub. Date: Oct. 15, 2015

(65) Prior Publication Data
US 2017/0028759 A1    Feb. 2, 2017

(30) Foreign Application Priority Data

Apr. 9, 2014  (JP) ................................. 2014-080244

(51) Int. Cl.
*B41J 2/01*     (2006.01)
*B41M 5/00*   (2006.01)
*B41M 7/00*   (2006.01)

(52) U.S. Cl.
CPC ........ *B41M 5/0017* (2013.01); *B41M 7/0081* (2013.01); *B41M 5/0023* (2013.01)

(58) Field of Classification Search
CPC .. B41M 7/0081; B41M 5/0023; B41M 7/009; B41M 5/0017; B41J 11/002; B41J 2/2107; B41J 2/01

(Continued)

(56) References Cited

U.S. PATENT DOCUMENTS

2008/0000384 A1   1/2008  Belelie et al.
2015/0062267 A1   3/2015  Maeda et al.

FOREIGN PATENT DOCUMENTS

EP    2796517 A1    10/2014
EP    2842761 A1    3/2015

(Continued)

OTHER PUBLICATIONS

Written Opinion of the International Searching Authority and International Preliminary Report on Patentability corresponding to Application No. PCT/JP2015/061004; dated May 19, 2015, with English Translation.

(Continued)

*Primary Examiner* — Jannelle M Lebron
(74) *Attorney, Agent, or Firm* — Cantor Colburn LLP

(57) ABSTRACT

An inkjet recording method using an active light-curable inkjet ink according to the present invention is characterized in that: the inkjet ink contains at least a gelling agent, a photopolymerizable compound and a photopolymerization initiator; the gelling temperature T1 (° C.) of the active light-curable inkjet ink, the temperature T2 (° C.) of the ink at the time when the active light-curable inkjet ink landed on a recording medium, and the temperature T3 (° C.) of the ink at the time when the active light-curable inkjet ink is irradiated with active light satisfy the relationship T1 (° C.)>T2 (° C.)>T3 (° C.); and the solubility of the gelling agent in the photopolymerizable compound at T3 (° C.) is less than 0.1% by mass. This inkjet recording method is capable of suppressing blooming, while at least maintaining the leveling properties and the pinning properties of an inkjet ink.

7 Claims, 4 Drawing Sheets

(58) Field of Classification Search
USPC .................................... 347/95, 96, 100, 102
See application file for complete search history.

(56) References Cited

FOREIGN PATENT DOCUMENTS

| | | |
|---|---|---|
| JP | 2011224994 A | 11/2011 |
| JP | 2012149256 A | 8/2012 |
| JP | 2013064092 A | 4/2013 |
| JP | 2013193288 A | 9/2013 |
| JP | 2013221048 A | 10/2013 |
| JP | 2013226745 A | 11/2013 |
| JP | 2013227410 A | 11/2013 |
| WO | 2012023368 A1 | 2/2012 |
| WO | 2013094198 A1 | 6/2013 |
| WO | 2013150802 A1 | 10/2013 |
| WO | 2013161328 A1 | 10/2013 |
| WO | 2015156326 A1 | 10/2015 |

OTHER PUBLICATIONS

International Search Report corresponding to Application No. PCT/JP2015/061004; dated May 19, 2015, with English translation.
Extended European Search Report for corresponding Application No. 15776371.5-1704/3130475 PCT/JP2015061004; dated Dec. 1, 2017.

INKJET RECORDING METHOD AND INKJET RECORDING APPARATUS

This is the U.S. national stage of application No. PCT/JP2015/061004, filed on Apr. 8, 2015. Priority under 35 U.S.C. § 119(a) and 35 U.S.C. § 365(b) is claimed from Japanese Application No. 2014-080244, filed Apr. 9, 2014, the disclosure of which is also incorporated herein by reference.

TECHNICAL FIELD

The present invention relates to an inkjet recording process. The present invention also relates to an inkjet recording apparatus using the inkjet recording process.

BACKGROUND ART

From the viewpoint of simple and inexpensive image production, an inkjet recording method has been used in a variety of printing fields. As the inkjet recording method, there is an UV-curable inkjet method wherein droplets of an UV-curable inkjet ink are landed on a recording medium and then cured by irradiation with ultraviolet rays to form an image. Recently, the UV-curable inkjet method has been attracting attention for its capability of forming images having high rubfastness and adhesiveness even on recording media which lack ink absorbing properties.

However, there have been various drawbacks in improving image quality in the image forming methods using a conventional UV-curable inkjet recording method. For example, there has been a drawback of poor image quality due to failure to prevent combining of neighboring dots (ink gathering) during high-speed recording such as single pass recoding using a line recording head or high speed serial recording.

In order to improve image quality, for example, PTL 1 discloses a method of leveling ink on a substrate, the method including irradiating ink disposed on a first surface of a porous substrate with first radiation emitted by at least one first radiant energy source, the first radiation heating the ink to at least a viscosity threshold temperature of the ink to allow the ink to flow laterally on the first surface to produce leveling of the ink, the ink being heated sufficiently rapidly to make heat transfer from the ink to the substrate sufficiently small during the leveling so that the ink at the substrate interface is cooled to a temperature below the viscosity threshold temperature, thereby preventing any significant ink permeation into the substrate.

Moreover, for example, PTL 2 discloses an inkjet recording process including: forming an image by discharging an actinic radiation-curable ink onto a recording medium; spraying a gas on the image formed on the recording medium; and irradiating the image formed on the recording medium with actinic radiation, in which the actinic radiation-curable ink is solid at room temperature (25° C.).

CITATION LIST

Patent Literature

PTL 1
Japanese Patent Application Laid-Open No. 2011-224994
PTL 2
Japanese Patent Application Laid-Open No. 2013-193288

SUMMARY OF INVENTION

Technical Problem

Conventionally, techniques of improving glossiness of an image obtained using an inkjet recording method by paying attention to a leveling property of inkjet inks, such as the techniques disclosed in PTL 1 and PTL 2, have been known.

However, there is a drawback that when the ink temperature is raised in the inkjet recording process at the time when an inkjet ink is landed on a recording medium or at the time when an inkjet ink is irradiated with actinic radiation in order to improve the leveling property, combining of dots (liquid gathering) due to lowering of the pinning property occurs to bring about deterioration of image quality. When attention is paid only on preventing combining of neighboring dots (liquid gathering), there is a technique of adding a gelling agent to an UV-curable inkjet ink as one of the methods of preventing combining of neighboring dots, and the UV-curable inkjet ink can prevent combining of neighboring dots (liquid gathering) by containing the gelling agent because the ink viscosity rapidly increases by sol-gel phase transition after the ink is landed (pinning effect).

Moreover, with respect to radically polymerizable type actinic radiation-curable inkjet inks, it has been known that polymerization reaction on the surface of an ink film is inhibited by oxygen; however, there is a research report stating that the inhibition by oxygen can be reduced even for radically polymerizable type actinic radiation-curable inkjet inks by causing inks to undergo gelation and increase the viscosity thereof.

Furthermore, in inkjet recording apparatuses using an actinic radiation-curable inkjet ink, when the deterioration of output from a light source such as a UV lamp with time occurs due to lifetime, when printing is carried out at a higher speed, or when the concentration of a pigment in inks is increased, the influence of inhibition by oxygen in polymerization reaction of inks becomes large because the quantity of energy to be irradiated onto the inks becomes small. As a result, a radical ink not containing a gelling agent causes an outstanding defect that stickiness on the surface is worsened. On the other hand, an actinic radiation-curable inkjet ink containing a gelling agent (gelling UV ink) is less likely to be affected by oxygen when compared with the radical ink not containing a gelling agent, and therefore the influence on a cured film immediately after printing is small and attention has never been paid on the influence in particular as a drawback.

However, as a result of diligent studies conducted by the present inventors, it has been proven that when the curability of the ink is lowered due to deterioration of a light source such as a UV lamp or other reasons, a serious defect occurs to a cured film even in the case where the actinic radiation-curable inkjet ink containing a gelling agent (gelling UV ink) is used. That is to say, it has been found that a blooming phenomenon in which the gelling agent migrates (also referred to as precipitate, bleed, or bleed out) onto the surface with time after curing. The occurrence of the blooming phenomenon not only causes a drawback that the surface of the ink film becomes powdery to harm the appearance as printed matter but also causes a drawback that lowering of image density or fluctuation of glossiness is brought about.

The present invention has been completed in view of the above-described circumstances, and the first object of the present invention is to provide an inkjet recording process capable of preventing blooming while maintaining at least the leveling property and pinning property of the actinic radiation-curable inkjet ink containing a gelling agent. And the second object of the present invention is to provide an inkjet recording process capable of obtaining printed matter which is cured by a small irradiation dose of light energy and to which image defects due to blooming with time do not occur. Furthermore, the third object of the present invention is to provide an inkjet recording apparatus using the inkjet recording process.

Solution to Problem

The present inventors have conducted diligent studies in order to achieve the objects and have completed the present invention by finding a solution including the following configuration.

Specific means for achieving the objects include [1] to [7] below.

[1] An inkjet recording process including:
  landing an actinic radiation-curable inkjet ink on a recording medium; and
  irradiating and curing the ink landed on the recording medium with actinic radiation, wherein:
    the actinic radiation-curable inkjet ink comprises at least:
    a gelling agent;
    a photocurable compound; and
    a photopolymerization initiator;
    a gelation temperature $T_1$ (° C.) of the actinic radiation-curable inkjet ink, an ink temperature $T_2$ (° C.) when the actinic radiation-curable inkjet ink is landed on the recording medium, and an ink temperature $T_3$ (° C.) when the actinic radiation-curable inkjet ink is irradiated with the actinic radiation satisfy the relation of $T_1$ (° C.)$>T_2$ (° C.)$>T_3$ (° C.); and
    a solubility of the gelling agent in the photocurable compound at $T_3$ (° C.) is less than 0.1 mass %.

[2] The inkjet recording process according to [1], wherein:
  a viscosity of the actinic radiation-curable inkjet ink at the ink temperature $T_2$ (° C.) is 10 Pa·s or more and less than 1,000 Pa·s; and
  a viscosity of the actinic radiation-curable inkjet ink at the ink temperature $T_3$ (° C.) is 10 Pa·s or more and less than 10,000 Pa·s.

[3] The inkjet recording process according to [1] or [2], wherein:
  a molecular weight of the gelling agent is less than 800, and a C log P value of the gelling agent is 6.0 or more;
  a content of the gelling agent is from 1.0 to 7.0 mass % relative to a total mass of the actinic radiation-curable inkjet ink; and
  the photocurable compound comprises a (meth)acrylate compound having a molecular weight within a range from 280 to 1,500 and a C log P value within a range from 4.0 to 7.0.

[4] The inkjet recording process according to any one of [1] to [3], wherein
  the gelling agent comprises at least one compound of a compound represented by the following formula (G1) and a compound represented by the following formula (G2):

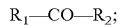   Formula (G1):

   Formula (G2):

wherein $R_1$ to $R_4$ each independently represent a hydrocarbon group comprising a straight-chain moiety having 12 or more carbon atoms and may further comprise a branched moiety.

[5] An inkjet recording apparatus using the inkjet recording process according to any one of [1] to [4].

[6] The inkjet recording apparatus according to [5], including:
  a landing section where the actinic radiation-curable inkjet ink is landed on the recording medium;
  an irradiation section where the ink landed on the recording medium is irradiated with actinic radiation;
  a temperature-adjusting mechanism A; and
  a temperature-adjusting mechanism B, wherein:
    the temperature-adjusting mechanism A is configured such that a temperature of the actinic radiation-curable inkjet ink at the landing section is adjusted to be the ink temperature $T_2$ (° C.); and
    the temperature-adjusting mechanism B is configured such that a temperature of the actinic radiation-curable inkjet ink at the irradiation section is adjusted to be the ink temperature $T_3$ (° C.).

[7] The inkjet recording apparatus according to [6], wherein
  the temperature-adjusting mechanism A and the temperature-adjusting mechanism B are discontinuously disposed.

Advantageous Effects of Invention

According to the present invention, an inkjet recording process capable of preventing blooming while maintaining at least a leveling property of an actinic radiation-curable inkjet ink is provided. Moreover, according to the present invention, an inkjet recording process capable of obtaining printed matter which is cured by a small irradiation dose of light energy and to which image defects due to blooming with time do not occur is provided. Furthermore, according to the present invention, an inkjet recording apparatus using the inkjet recording process is provided.

DESCRIPTION OF EMBODIMENTS

Figure 1:
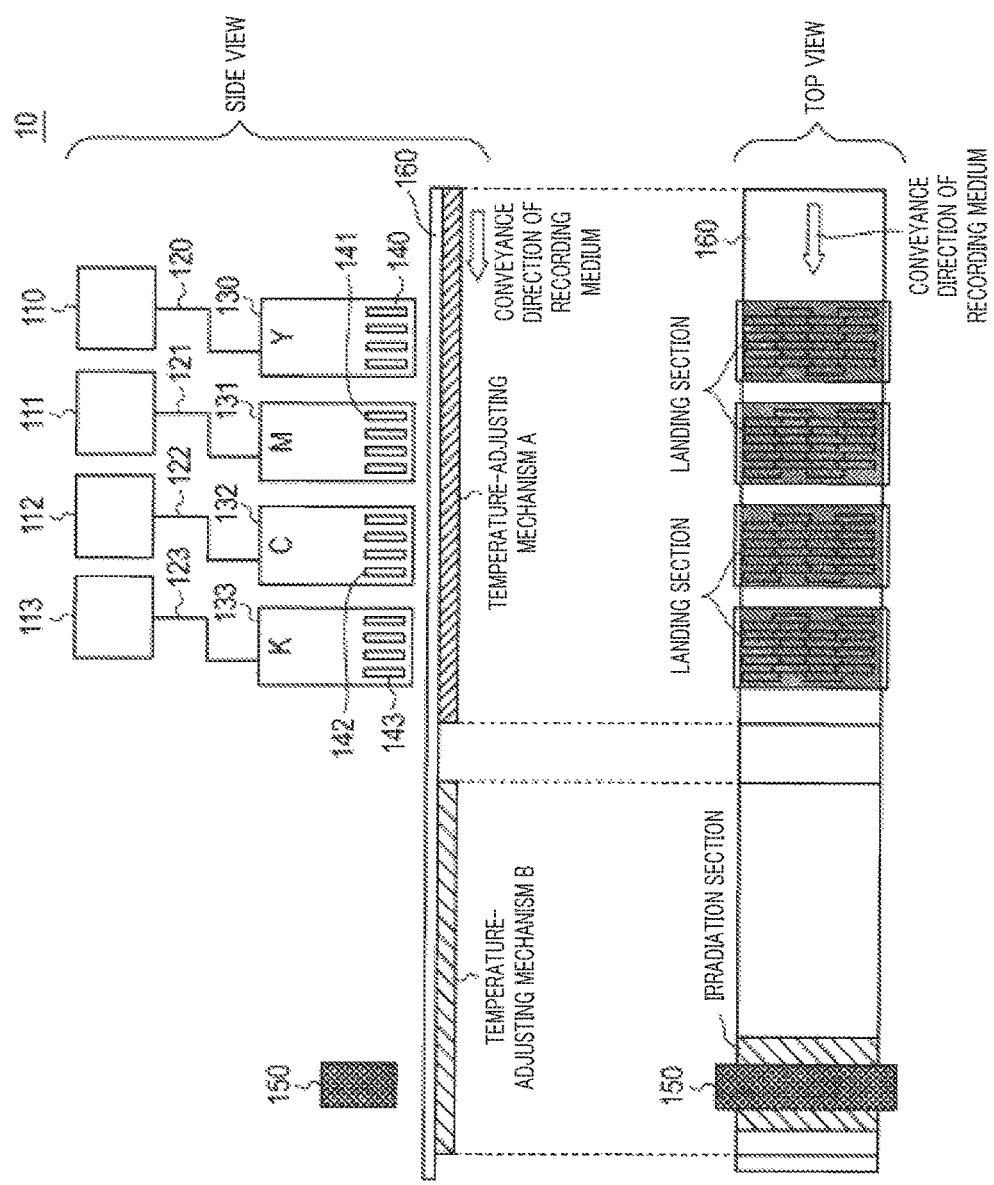
FIG. 1 includes a side view and a top view schematically illustrating inkjet recording apparatus 10 which is one aspect of an inkjet recording apparatus according to the present invention.

Hereinafter, the present invention will be described in detail.

1. Inkjet Recording Process

The inkjet recording process according to the present invention is an inkjet recording process including: landing an actinic radiation-curable inkjet ink on a recording medium; and irradiating and curing the ink landed on the recording medium with actinic radiation, wherein: the actinic radiation-curable inkjet ink comprises at least: a gelling agent; a photocurable compound; and a photopolymerization initiator; a gelation temperature $T_1$ (° C.) of the actinic radiation-curable inkjet ink, an ink temperature $T_2$ (° C.) when the actinic radiation-curable inkjet ink is landed on the recording medium, and an ink temperature $T_3$ (° C.) when the actinic radiation-curable inkjet ink is irradiated with the actinic radiation satisfy the relation of $T_1$ (° C.)>$T_2$ (° C.)>$T_3$ (° C.); and a solubility of the gelling agent in the photocurable compound at $T_3$ (° C.) is less than 0.1 mass %.

The inkjet recording process according to the present invention exhibits the first effect that printed matter which is cured by a small irradiation dose of light energy and to which image defects due to blooming with time do not occur can be obtained, and further exhibits the second effect that blooming can be prevented while the leveling property of the actinic radiation-curable inkjet ink is maintained.

It is inferred that the reason the two effects are exhibited by the inkjet recording process according to the present invention is as follows.

The deterioration of a UV light source or the like with time, the high-speed printing, or the increase of the pigment concentration means that the light energy irradiated onto the actinic radiation-curable inkjet ink is reduced. On the other hand, the inhibition reaction by oxygen is slight in the gelling agent-containing actinic radiation-curable inkjet ink (gelling UV ink), and therefore deterioration of performance as a cured film due to such a change in light irradiation energy is hardly observed at a glance. However, an extremely small amount of an unreacted monomer remains in a portion inside the cured film, and it is inferred that part of the gelling agent dissolved in the unreacted monomer migrates onto the surface of the ink film with time.

Against such a drawback, the present inventors have found that even when an extremely small amount of the unreacted monomer remains in the ink, blooming of the gelling agent with time can be prevented by making the amount of the gelling agent that can be dissolved in the monomer small. More specifically, prevention of blooming can be achieved by controlling temperatures such that the ink temperature $T_3$ at the time of irradiation such as UV irradiation is lower than the ink temperature $T_2$ at the time of landing of the ink and by making the solubility of the gelling agent at the time of UV irradiation less than 0.1%.

When the ink temperature $T_2$ at the time of UV irradiation and the ink temperature $T_3$ at the time of landing of the ink are the same, the viscosity of the ink is excessively increased within a temperature range that satisfies the solubility of the gelling agent, and therefore the leveling property of dots on a recording medium (substrate) becomes deficient to cause streaks and blanks on the solid print portion. By changing the ink temperatures at the time of UV irradiation and at the time of landing of the ink, the leveling property and the solubility of the gelling agent can be controlled.

In the inkjet recording process according to the present invention, $T_1$ (° C.), $T_2$ (° C.), and $T_3$ (° C.) each may be arbitrary as long as $T_1$ (° C.), $T_2$ (° C.), and $T_3$ (° C.) satisfy the relation of $T_1$ (° C.)>$T_2$ (° C.)>$T_3$ (° C.); however, it is preferable to satisfy $T_2$ (° C.)–$T_3$ (° C.)>3° C., more preferably $T_2$ (° C.)–$T_3$ (° C.)>5° C., and even more preferably $T_2$ (° C.)–$T_3$ (° C.)>10° C.

Moreover, $T_1$ (° C.), $T_2$ (° C.), and $T_3$ (° C.) each may be arbitrary as long as $T_1$ (° C.), $T_2$ (° C.), and $T_3$ (° C.) satisfy the relation of $T_1$ (° C.)>$T_2$ (° C.)>$T_3$ (° C.); however, $T_1$ (° C.) is preferably 30° C. or higher and lower than 100° C., more preferably 30° C. or higher and lower than 70° C., and even more preferably 30° C. or higher and lower than 60° C. Further, $T_1$ (° C.) is preferably lower than the ink temperature inside an inkjet recording head from the viewpoint of ability of discharge.

$T_2$ (° C.) is preferably 30° C. or higher and less than 100° C., more preferably 30° C. or higher and less than 65° C., and even more preferably 30° C. or higher and less than 55° C. Further, $T_2$ (° C.) is required to be lower than $T_1$ (° C.) from the viewpoint of the pinning property.

$T_3$ (° C.) is preferably 30° C. or higher and less than 100° C., more preferably 30° C. or higher and less than 60° C., and even more preferably 30° C. or higher and lower than 50° C. $T_3$ (° C.) is required to be lower than $T_2$ (° C.) from the viewpoint of the leveling property.

In the inkjet recording process according to the present invention, the solubility of the gelling agent in the photocurable compound at $T_3$ (° C.) is less than 0.1 mass %, and when the solubility is 0.1 mass % or more, the gelling agent undergoes blooming with time after curing.

On the other hand, in the case where the ink is landed at $T_2$ (° C.) and $T_3$ (° C.) set to the same temperature, even when the solubility of the gelling agent is less than 0.1 mass % at $T_3$ (° C.), the leveling property is lowered because pinning becomes excessively strong, and therefore blanks and white streaks are likely to occur in the solid print portion. Moreover, in the case where $T_1$ (° C.) and $T_2$ (° C.) are the same temperature, liquid gathering is likely to occur because pinning at the time of landing becomes excessively weak. Therefore, in order to prevent blooming with time while appropriately maintaining at least the leveling property and the pinning property, it is required to satisfy the relation of $T_1$ (° C.)>$T_2$ (° C.)>$T_3$ (° C.).

The effects according to the present invention are not damaged as long as the solubility of the gelling agent at $T_3$ (° C.) is less than 0.1% and the relation of $T_1$ (° C.)>$T_2$ (° C.)>$T_3$ (° C.) is satisfied; however, more preferable conditions in the viewpoint of the leveling property and pinning property include setting the solubility of the gelling agent at $T_2$ (° C.) to a range from 0.1% or more to less than 1.0% in addition to the relation. By setting the solubility of the gelling agent at $T_2$ (° C.) to the range, the leveling property can be enhanced more while preventing the deterioration of image quality due to liquid gathering.

In the inkjet recording process according to the present invention, it is preferable that the viscosity of the actinic radiation-curable inkjet ink at $T_2$ (° C.) should be 10 Pa·s or more and less than 1,000 Pa·s and the viscosity of the actinic radiation-curable inkjet ink at $T_3$ (° C.) should be 10 Pa·s or more and less than 10,000 Pa·s. Moreover, it is more preferable that the viscosity of the actinic radiation-curable inkjet ink at $T_2$ (° C.) should be 10 Pa·s or more and less than 500 Pa·s and the viscosity of the actinic radiation-curable inkjet ink at $T_3$ (° C.) should be 100 Pa·s or more and less than 10,000 Pa·s. The inkjet recording process according to the present invention exhibits all the more the first effect of capable of obtaining printed matter which is cured by a small irradiation dose of light energy and to which image defects due to blooming with time do not occur, and exhibits all the more the second effect of capable of preventing blooming while maintaining at least the leveling property of the actinic radiation-curable inkjet ink by the preferable aspect or the more preferable aspect.

The viscosity of the actinic radiation-curable inkjet ink at $T_2$ (° C.) and the viscosity of the actinic radiation-curable inkjet ink at $T_3$ (° C.) can be found by measuring a temperature change in dynamic viscoelasticity of the ink using a rheometer. Specifically, when the ink is heated to 100° C. and cooled to 20° C. with conditions including shear rate of 11.7 (/s) and temperature decrease rate of 0.1° C./s, a temperature change curve of the viscosity is obtained. Further, the viscosity at $T_2$ (° C.) and the viscosity at $T_3$ (° C.) can be obtained by reading each of the viscosities at $T_2$ (° C.) and $T_3$ (° C.) in a temperature change curve of the viscosity.

As for the rheometer, stress control type rheometer Physica MCR series manufactured by Anton Paar can be used. The size of the corn plate diameter can be 25 mm, 50 mm, or 75 mm and the corn angle can be 1.0°.

The inkjet recording process according to the present invention includes: landing an actinic radiation-curable inkjet ink on a recording medium; and irradiating and curing the ink landed on the recording medium with actinic radiation.

[Landing Actinic Radiation-Curable Inkjet Ink on Recording Medium]

Droplets of the actinic radiation-curable inkjet ink are jetted using an inkjet recording head to land the droplets on a recording medium. To enhance jetting ability of the ink droplets, the temperature of the inkjet ink inside the inkjet recording head is preferably set such that it is from 10 to 30° C. higher than the gelation temperature of the inkjet ink. When the ink temperature inside the inkjet recording head is lower than (gelation temperature+10)° C., the ink undergoes gelation inside the inkjet recording head or at the surface of the nozzle, and thus jetting ability of ink droplets is likely to be lowered. On the other hand, when the ink temperature inside the inkjet recording head is higher than (gelation temperature+30°) C., the ink is at excessively high temperature, and thus the ink components may be deteriorated. Therefore, the inkjet ink droplets at the above-described temperature may be discharged by heating the inkjet ink connected to the inkjet recording head, an ink channel that is connected to the inkjet recording head, or an ink channel.

The amount of liquid per ink droplet jetted from each nozzle of the inkjet recording head may vary depending on the resolution of an image, and it is preferably from 0.5 to 10 pl, and, for forming a high-resolution image, it is more preferably from 0.5 to 2.5 pl. In order to form a high-resolution image with such a liquid amount, the dissolution stability of the gelling agent in the actinic radiation-curable inkjet ink is required. The dissolution stability of the gelling agent is secured by the composition of the actinic radiation-curable inkjet ink for use in the inkjet recording process according to the present invention, and therefore it is possible to stably form a high-resolution image even with such a liquid amount.

The droplets of the ink landed on a recording medium are cooled and quickly undergo gelation by sol-gel phase transition. As a result, the ink droplets can be pinned without diffusion. Furthermore, as described above, oxygen inhibition to the photocurable compound can be reduced.

The recording medium can be either paper or a resin film. Examples of the paper include coated paper for printing and coated paper B for printing. Further, examples of the resin film include a polyethylene terephthalate film, a vinyl chloride film, a polypropylene film and a polyethylene film.

By allowing ink droplets to be discharged from the inkjet recording head, the ink droplets are landed and attached onto a recording medium. The temperature when the ink droplets are landed on the recording medium is preferably set such that it is from 10 to 20° C. lower than the gelation temperature of this ink. When the temperature of the recording medium is excessively low, the ink droplets undergo gelation and pinning too fast, and thus leveling of the ink droplets does not occur sufficiently and the glossiness of an image may be lowered. On the other hand, when the temperature of the recording medium is excessively high, it is difficult for the ink droplets to undergo gelation, and therefore neighboring dots of the ink droplets may be mixed with each other. By appropriately adjusting the temperature of the recording medium, it is possible to achieve both a moderate level of leveling that does not allow for mixing among neighboring dots of the ink droplets and appropriate pinning.

[Irradiating and Curing Ink Landed on Recording Medium with Actinic Radiation]

By irradiating droplets of the actinic radiation-curable inkjet ink landed on a recording medium, the photocurable compounds contained in the ink droplets undergo crosslinking or polymerization to cure the ink droplets and form an image.

The light to be directed to the ink droplets landed and attached onto a recording medium may be optional as long as the effects according to the present invention are exhibited, but is preferably ultraviolet rays from LED light source(s). Specifically, 395 nm, Water Cooled LED manufactured by Phoseon Technology can be used. As a UV light source, a metal halide lamp or the like can be used; however, use of an LED light source gives an effect of preventing poor curing at the surface of the cured film of the ink droplets by preventing melting the ink droplets due to radiation heat of the light source.

An LED as a light source is preferably installed such that it provides UV rays of from 370 to 410 nm wavelength with peak luminance from 0.5 to 10 W/cm$^2$, and more preferably from 1 to 5 W/cm$^2$ on a surface of the image in order to cure the ink droplets. It is preferable that irradiation time should be adjusted appropriately such that the light quantity to be irradiated onto an image is adjusted to be lower than 350 mJ/cm$^2$ in order to limit the irradiation of the ink droplets with radiation heat. The irradiation time can be changed appropriately by adjusting the position of the light source or the conveyance speed. A more preferable range of the light quantity to be irradiated onto an image is 50 mJ/cm$^2$ or more and less than 350 mJ/cm$^2$, and when the light quantity to be irradiated onto an image is less than 50 mJ/cm$^2$, image quality may be deteriorated or photocuring of the ink may become insufficient.

In order to prevent combining of neighboring ink droplets, light irradiation onto the droplets of the actinic radiation-curable inkjet ink for use in the inkjet recording process according to the present invention is conducted within 10 seconds, preferably within from 0.001 seconds to 5 seconds, and more preferably within from 0.01 seconds to 2 seconds after the ink droplets are landed and attached onto a recording medium. Light irradiation is preferably conducted after the ink droplets are jetted from all of the inkjet recording heads accommodated in a head carriage.

[Actinic Radiation-Curable Inkjet Ink]

The actinic radiation-curable inkjet ink for use in the inkjet recording process according to the present invention includes at least a gelling agent, a photocurable compound, and a photopolymerization initiator.

Because the actinic radiation-curable inkjet ink contains a gelling agent, it undergoes temperature induced reversible sol-gel phase transition. Since the actinic radiation-curable inkjet ink which undergoes sol-gel phase transition is liquid (sol) at high temperatures (e.g., from about 80° C. to about 100° C.), the ink can be discharged in a sol state from the inkjet recording head. Once the actinic radiation-curable inkjet ink is discharged at a high temperature, ink droplets (dots) are landed on a recording medium and undergo gelation by natural cooling. Accordingly, combining of neighboring dots is prevented and thus image quality is improved.

In order to enhance ability of the ink discharge, the viscosity of the ink at a high temperature is preferably the same or lower than a predetermined value.

The gelation temperature is a temperature when fluidity is lowered by gelation of the ink in a sol state in a process of cooling the sol-state-ink.

The gelation temperature of the ink can be found by measuring a temperature change in dynamic viscoelasticity of the ink using a rheometer. Specifically, when the ink is heated to 100° C. and cooled to 20° C. with conditions including shear rate of 11.7 (/s) and temperature decrease rate of 0.1° C./s, a temperature change curve of the viscosity is obtained. The gelation temperature can be obtained as a temperature where the viscosity is 200 mPa·s in the temperature change curve of the viscosity.

As for the rheometer, stress control type rheometer Physica MCR series manufactured by Anton Paar can be used. The size of the corn plate can be 75 mm and the corn angle can be 1.0°.

[Gelling Agent]

The gelling agent contained in the actinic radiation-curable inkjet ink for use in the inkjet recording process according to the present invention has a function of causing the ink to undergo temperature-induced reversible sol-gel phase transition. Such a gelling agent may satisfy at least the following conditions: 1) the gelling agent can be dissolved in the photocurable compound at a temperature higher than the gelation temperature; and 2) the gelling agent can be crystallized in the ink at a temperature equal to or lower than the gelation temperature.

The term "sol-gel phase transition temperature" refers to a temperature at a change (transition) point where a change (transition) occurs from a sol state to a gel state and has the same meaning as the terms called as gel transition temperature, gel-melting temperature, gel-softening temperature, sol-gel transition point, and gelation point. In the inkjet recording process according to the present invention, the gelation temperature of the actinic radiation-curable inkjet ink is defined as $T_1$ (° C.).

When the gelling agent is crystallized in an ink, it is preferable that a space three-dimensionally surrounded by plate-like crystals, a crystallization product of the gelling agent, is formed so that the photocurable compound is included in that space. A structure in which a photocurable compound is included in a space three-dimensionally surrounded by plate-like crystals can be referred to as a "card house structure." Once the card house structure is formed, the liquid photocurable compound can be maintained therein and ink droplets can be pinned. Accordingly, combining of liquid droplets can be prevented. The card house structure refers to a state in which a liquid photocurable compound is maintained in the space thereof.

From a viewpoint of stably discharging the droplets of the actinic radiation-curable inkjet ink, it is required that compatibility between the photocurable compound and the gelling agent should be secured in the ink in a sol state (at high temperatures). Furthermore, from a viewpoint of stably preventing combining of droplets even at the time of high-speed printing, it is required that, after ink droplets are landed on a recording medium, the gelling agent should be cooled and immediately crystallized and preferably, a strong card house structure should be formed.

The sol-gel phase transition temperature of the actinic radiation-curable inkjet ink can be set arbitrarily as long as the effects according to the present invention are exhibited, but is preferably within a range from 30 to 100° C. from the viewpoints of stable jetting of ink droplets and ill effects associated with heating at high temperatures. Moreover, the sol-gel transition temperature is preferably between the ink temperature inside an inkjet recording head and a temperature of a recording medium.

As for the method for measuring the sol-gel transition temperature, for example, a test piece in a gel state is placed on a heat plate, the heat plate is then heated, and a temperature measured when the shape of the test piece collapses can be found as the sol-gel phase transition temperature. The sol-gel transition temperature can also be measured using a commercially available viscoelasticity measuring apparatus (for example, viscoelasticity measuring apparatus MCR 300 manufactured by Physica).

The sol-gel transition temperature can be adjusted by the type and amount added, etc. of the gelling agent and the photocurable compound described later, etc.

In the inkjet recording process according to the present invention, it is preferable that the molecular weight of the gelling agent should be less than 800 and the C log P of the gelling agent should be 6.0 or more, and it is more preferable that the molecular weight of the gelling agent should be less than 500 and the C log P of the gelling agent should be 10.0 or more. The inkjet recording method according to the present invention exhibits all the more the first effect of capable of obtaining printed matter which is cured by a small irradiation dose of light energy and to which image defects due to blooming with time do not occur, and exhibits all the more the second effect of capable of preventing blooming while maintaining at least the leveling property of the actinic radiation-curable inkjet ink by the preferable aspect or the more preferable aspect.

The molecular weight of the gelling agent can be measured using a commercially available software package 1 or 2 described below.

Software Package 1: MedChem Software (Release 3.54, August, 1991, Medicinal Chemistry Project, Pomona College, Claremont, Calif.)

Software Package 2: Chem Draw Ultra ver. 8.0. (April, 2003, CambridgeSoft Corporation, USA)

The "Log P value" refers to a coefficient showing the affinity of an organic compound to water and 1-octanol. The 1-octanol/water distribution coefficient P refers to a distribution equilibrium when a small amount of a compound dissolves as a solute in a two-liquid phase of 1-octanol and water, is a ratio of the equilibrium concentration of the compound in each solvent, and is represented by a logarithm of the ratio to base 10, namely Log P. That is to say, the "Log P value" refers to a logarithmic value of the 1-octanol/water distribution coefficient, and is known as an important parameter showing hydrophilicity and hydrophobicity of a molecule.

Further, the "C Log P value" refers to a Log P value determined by calculation. The C Log P value can be determined by a fragment method, an atomic approach method, or other methods. More specifically, in order to determine the C Log P value, the fragment method described in the literature (C. Hansch and A. Leo, "Substituent Constants for Correlation Analysis in Chemistry and Biology" (John Wiley & Sons, New York, 1969)), or commercially available software package 1 or 2 described below may be used.

Software Package 1: MedChem Software (Release 3.54, August, 1991, Medicinal Chemistry Project, Pomona College, Claremont, Calif.)

Software Package 2: Chem Draw Ultra ver. 8.0. (April, 2003, CambridgeSoft Corporation, USA)

The numerical values of the C log P described in the present specification, etc. are "C Log P values" calculated using software package 2.

Examples of the gelling agent include dialkyl ketones, fatty acid esters, fatty acid alcohols, fatty acid amides, and oil gelling agents, etc.

Specific examples of the gelling agent favorably include, but not limited to: low-molecular weight compounds having a molecular weight of less than 1,000 such as fatty acid alcohols including stearone (18-pentatriacontanone), 16-hentriacontanone, 12-tricosanone, and UNILIN 425, fatty acid esters, inulin stearate.fatty acid dextrins (available as RHEOPEARL series from Chiba Flour Milling Co., Ltd.), L-glutamic acid derivatives (available from Ajinomoto Fine-Techno Co., Inc.), fatty acid amides (FATTY AMID series, available from Kao Corporation), glyceryl behenate/eicosanedioate (NOMCORT HK-G, available from Nisshin Oillio Group, Ltd.), jojoba ester (Floraester 70, available from Ikeda Corporation), and oil gelling agents described in Japanese Patent Application Laid-Open Nos. 2005-126507 and 2005-255821.

Moreover, specific examples of the gelling agent being fatty acid amides include FATTY AMID E: erucic acid amide, FATTY AMID T: oleic acid amide, FATTY AMID O-N: hydrogenated tallow acid amide (all available from Kao Corporation), NIKKA AMIDE AP1: stearic acid amide (available from Nippon Kasei Chemical Co., Ltd.), and GP-1: N-lauroyl-L-glutamic acid dibutylamide (available from Ajinomoto Fine-Techno Co., Inc.).

Examples of particularly preferable gelling agent include compounds represented by the following Formulas (G1) and (G2):

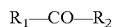

Formula (G1): $R_1-CO-R_2$

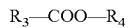

Formula (G2): $R_3-COO-R_4$

In Formulas (G1) and (G2), $R_1$ to $R_4$ each independently represent a hydrocarbon group having a straight-chain moiety having 12 or more carbon atoms, and may also have a branched moiety.

The compound represented by Formula (G1) is called as ketone wax, and the compound represented by Formula (G2) is called as a fatty acid ester. These gelling agents are preferable because these gelling agents can cause the ink droplets to undergo gelation more stably (with better reproducibility) and combining of ink droplets (dots) landed on a recording medium can be prevented.

When the gelling agent contains at least any one of the compound represented by Formula (G1) and the compound represented by Formula (G2) in the inkjet recording process according to the present invention, the inkjet recording process according to the present invention exhibits all the more the first effect of capable of obtaining printed matter which is cured by a small irradiation dose of light energy and to which image defects due to blooming with time do not occur, and exhibits all the more the second effect of capable of preventing blooming while maintaining at least the leveling property of the actinic radiation-curable inkjet ink.

Specific examples of the gelling agent being ketone wax or a fatty acid ester include, but not limited to, the compounds described below in Table 1.

TABLE 1

| Classification | Structure | Name | Manufacturer |
|---|---|---|---|
| Ketone wax | Distearyl ketone | Kao Wax T1 | Kao |
| | | 18-Pentatrlacontanone | Reagent (Arfa Aeser) |

TABLE 1-continued

| Classification | Structure | Name | Manufacturer |
|---|---|---|---|
| | Dipalmityl ketone | Hentriacontan-16-on | Reagent (Arfa Aeser) |
| | Dilauryl ketone | 12-tricosanone | Reagent (Arfa Aeser) |
| Fatty acid ester | Stearyl stearate | EXCEPARL SS | Kao |
| | | UNISTAR M-9676 | NOF |
| | | EMALEX CC-18 | Nihon Emulsion |
| | | AMREPS SS | Kokyu Alcohol Kogyo |
| | Cetyl palmitate | AMREPS PC | Kokyu Alcohol Kogyo |
| | Behenyl behenate | UNISTAR M-2222SL | NOF |

The actinic radiation-curable inkjet ink for use in the inkjet recording process according to the present invention contains a predetermined amount of a gelling agent and therefore quickly changes into a gel state when the ink is discharged from an inkjet recording head and landed on a recording medium as ink droplets and the ink temperature decreases to a temperature lower than the sol-gel phase transition temperature. Therefore, mixing of dots and combining of dots are prevented and a high-quality image can be formed at high-speed printing. The gelled ink droplets are then cured by light irradiation to be fixed on the recording medium, and thus a strong image film is formed.

As for the actinic radiation-curable inkjet ink for use in the inkjet recording process according to the present invention, the ink droplets landed on a recording medium quickly undergo gelation not to allow the ink droplets to diffuse on the recording medium, and therefore oxygen in the environment is less likely to enter the droplets. Thus, curing is less likely to be affected by oxygen inhibition.

The content of the gelling agent in an inkjet ink is preferably from 0.5 to 10 mass %, and more preferably from 1.0 to 7.0 mass % from the viewpoint of solubility in the ink and of jetting ability of the ink droplets.

(Solubility of Gelling Agent)

The solubility of the gelling agent refers to saturated solubility of the gelling agent in a liquid composition excluding: components such as pigments described later; and the gelling agent from the actinic radiation-curable inkjet ink. As for the method for measuring the solubility of the gelling agent, 100 g of the liquid composition is heated to a predetermined temperature and is then stirred and mixed adding an intended gelling agent little by little, and the maximum amount of the gelling agent added that can be dissolved at the temperature is measured. And the maximum amount of the gelling agent added that can be dissolved is defined as the saturated solubility at the temperature.

[Photocurable Compound]

The actinic radiation-curable inkjet ink for use in the inkjet recording process according to the present invention contains a photocurable compound. The photocurable compound refers to a compound which undergoes crosslinking or polymerization by irradiation with actinic radiation. Examples of actinic radiation include electron beams, ultraviolet rays, α rays, γ rays, and X rays. Ultraviolet rays are preferable. The photocurable compound is a radical polymerizable compound or a cationic polymerizable compound. A radical polymerizable compound is preferable.

(Radical Polymerizable Compound)

The radical polymerizable compound is a compound (monomer, oligomer, polymer or mixture of these) which has an ethylenically unsaturated bond, which is radically polymerizable. The radical polymerizable compound may be used alone or in combination of two or more types thereof.

Examples of the compound having an ethylenically unsaturated bond, which is radically polymerizable, include an unsaturated carboxylic acid and a salt thereof, an unsaturated carboxylic ester compound, an unsaturated carboxylic urethane compound, an unsaturated carboxylic amide compound and an anhydride thereof, acrylonitrile, styrene, unsaturated polyester, unsaturated polyether, unsaturated polyamide, and unsaturated urethane. Examples of the unsaturated carboxylic acid include (meth)acrylic acid, itaconic acid, crotonic acid, isocrotonic acid, and maleic acid.

Among the foregoing, the radical polymerizable compound is preferably an unsaturated carboxylic ester compound and more preferably a (meth)acrylate compound. The (meth)acrylate compound may, in addition to a monomer, be an oligomer, a mixture of a monomer and an oligomer, a modified product, or an oligomer having a polymerizable functional group. The term "(meth)acrylate" indicates both or one of "acrylate" and "methacrylate" and the term "(meth)acryl" indicates both or one of "acryl" and "methacryl".

In the actinic radiation-curable inkjet ink for use in the inkjet recording process according to the present invention, a (meth)acrylate compound (sometimes referred to as "(meth)acrylate compound A", the same applies hereinafter) having a molecular weight within a range from 280 to 1,500 and a C log P value within a range from 4.0 to 7.0 is preferably contained as a photocurable compound. (Meth)acrylate compound A preferably has two or more (meth)acrylate groups. By using the preferable photocurable compound or the more preferable photocurable compound, the inkjet recording method according to the present invention exhibits all the more the first effect of capable of obtaining printed matter which is cured by a small irradiation dose of light energy and to which image defects due to blooming with time do not occur, and exhibits all the more the second effect of capable of preventing blooming while maintaining at least the leveling property of the actinic radiation-curable inkjet ink.

The molecular weight of (meth)acrylate compound A is preferably within a range from 280 to 1,500 as described above, and more preferably within a range from 300 to 800. From a viewpoint of stably discharging the ink from the inkjet recording head, it is required that the ink viscosity at the discharge temperature should be set to be between 7 to 14 mPa·s. When the (meth)acrylate compound having a molecular weight of 280 or more and the gelling agent are contained in an ink composition, the change in the ink viscosity at around the discharge temperature can be made small and the ink viscosity can easily be adjusted within the above-described range. Further, the (meth)acrylate compound having a molecular weight of 280 or more has less odor, and therefore the odor from the actinic radiation-curable inkjet ink and the cured product thereof can be reduced. On the other hand, when the (meth)acrylate compound having a molecular weight of 1,500 or less is contained, excessive increase of the sol viscosity of the ink can be suppressed.

The molecular weight of (meth)acrylate compound A can be measured using a commercially available software package 1 or 2 described below.

Software Package 1: MedChem Software (Release 3.54, August, 1991, Medicinal Chemistry Project, Pomona College, Claremont, Calif.)

Software Package 2: Chem Draw Ultra ver. 8.0. (April, 2003, CambridgeSoft Corporation, USA)

The C log P value of (meth)acrylate compound A is preferably within a range from 4.0 to 7.0 as described above, and more preferably within a range from 4.5 to 6.0. When the C log P value of (meth)acrylate compound A is less than 4.0, the actinic radiation-curable inkjet ink becomes hydrophilic and therefore the gelling agent is less likely to be dissolved. Thus, the gelling agent is not dissolved completely even when heated and ink does not undergo sol-gel phase transition sufficiently. Further, poor discharge from the inkjet recording apparatus is likely to occur. On the other hand, when the C log P value of (meth)acrylate compound A exceeds 7.0, the solubility of the photopolymerization initiator in the ink is lowered, and therefore curability of the ink is lowered and ability of discharge from the inkjet recording head is lowered.

The "Log P value" herein refers to a coefficient showing the affinity of an organic compound to water and 1-octanol. The 1-octanol/water distribution coefficient P refers to a distribution equilibrium when a small amount of a compound dissolves as a solute in a two-liquid phase of 1-octanol and water, is a ratio of the equilibrium concentration of the compound in each solvent, and is represented by a logarithm of the ratio to base 10, namely Log P. That is to say, the "Log P value" refers to a logarithmic value of the 1-octanol/water distribution coefficient, and is known as an important parameter showing hydrophilicity and hydrophobicity of a molecule.

The "C Log P value" refers to a Log P value determined by calculation. The C Log P value can be determined by a fragment method, an atomic approach method, or other methods. More specifically, in order to determine the C Log P value, the fragment method described in the literature (C. Hansch and A. Leo, "Substituent Constants for Correlation Analysis in Chemistry and Biology" (John Wiley & Sons, New York, 1969)), or commercially available software package 1 or 2 described below may be used.

Software Package 1: MedChem Software (Release 3.54, August, 1991, Medicinal Chemistry Project, Pomona College, Claremont, Calif.)

Software Package 2: Chem Draw Ultra ver. 8.0. (April, 2003, CambridgeSoft Corporation, USA)

The numerical values of the C log P values described in the present specification, etc. are "C Log P values" calculated using software package 2.

The amount of (meth)acrylate compound A contained in the actinic radiation-curable inkjet ink may be arbitrary as long as the effects according to the present invention are exhibited, but is preferably within a range from 10 to 40 mass % in the total mass of the actinic radiation-curable inkjet ink. When the amount of (meth)acrylate compound A is set to be 10 mass % or more, the ink does not become excessively hydrophilic and the gelling agent is dissolved sufficiently, and therefore the ink easily undergoes sol-gel phase transition. On the other hand, when the amount of (meth)acrylate compound A is set to be 40 mass % or less, the photopolymerization initiator can be dissolved in ink sufficiently.

More preferable examples of (meth)acrylate compound A include: (1) trifunctional or higher methacrylate or acrylate compounds having 3 to 14 structures represented by (—C(CH$_3$)H—CH$_2$—O—) in the molecule thereof; and (2) bifunctional or higher methacrylate or acrylate compounds having a cyclic structure in the molecule thereof. These (meth)acrylate compounds have superior photocurability and low shrinks at curing. In addition, these (meth)acrylate compounds have superior repetition reproducibility of sol-gel phase transition.

The trifunctional or higher methacrylate or acrylate compound having 3 to 14 structures each represented by (—C(CH$_3$)H—CH$_2$—O—) in the molecule thereof refers to, for example, a compound obtained by modifying hydroxide groups in a compound having three or more hydroxide groups with propylene oxide and then esterifying the resultant modified product with (meth)acrylic acid. Specific examples of the compound include:

3PO modified trimethylolpropane triacrylate Photomer 4072 (molecular weight: 471, C log P: 4.90, manufactured by Cognis); and 3PO modified trimethylolpropane triacrylate Miramer M360 (molecular weight: 471, C log P: 4.90, manufactured by Miwon Specialty Chemical Co., Ltd.).

The bifunctional or higher methacrylate or acrylate compound having a cyclic structure in the molecule thereof refers to, for example, a compound obtained by esterifying hydroxy groups in a compound having two or more hydroxy groups and a tricycloalkane with (meth)acrylic acid. Specific examples of the compound include:

tricyclodecanedimethanol diacrylate NK ester A-DCP (molecular weight: 304, C log P: 4.69); and tricyclodecanedimethanol dimethacrylate NK ester DCP (molecular weight: 332, C log P: 5.12).

Other specific examples of (meth)acrylate compound A include 1,10-decanediol dimethacrylate NK ester DOD-N (molecular weight: 310, C log P: 5.75, manufactured by Shin-Nakamura Chemical Co., Ltd.).

The photocurable compound may further contain an additional photocurable compound other than (meth)acrylate compound A. Examples of the additional photocurable compound include: (meth)acrylate monomers or oligomers having a C log P value of less than 4.0; (meth)acrylate monomers or oligomers having a C log P value of exceeding 7.0; and additional polymerizable oligomers.

Examples of the (meth)acrylate monomer or oligomer include: 4EO modified hexanediol diacrylate (CD561 manufactured by Sartomer Company, molecular weight: 358); 3EO modified trimethylolpropane triacrylate (SR454 manufactured by Sartomer Company, molecular weight: 429); 4EO modified pentaerythritol tetraacrylate (SR494 manufactured by Sartomer Company, molecular weight: 528); 6EO modified trimethylolpropane triacrylate (SR499 manufactured by Sartomer Company, molecular weight: 560); caprolactone acrylate (SR495B manufactured by Sartomer Company); polyethylene glycol diacrylate (NK ester A-400 manufactured by Shin-Nakamura Chemical Co., Ltd., molecular weight: 508), (NK ester A-600 manufactured by Shin-Nakamura Chemical Co., Ltd., molecular weight: 708); polyethylene glycol dimethacrylate (NK ester 9G manufactured by Shin-Nakamura Chemical Co., Ltd., molecular weight: 536), (NK ester 14G manufactured by Shin-Nakamura Chemical Co., Ltd.); tetraethylene glycol diacrylate (V#335HP manufactured by OSAKA ORGANIC CHEMICAL INDUSTRY LTD., molecular weight: 302); stearyl acrylate (STA manufactured by OSAKA ORGANIC CHEMICAL INDUSTRY LTD.); phenol EO modified acrylate (M144 manufactured by Miwon Specialty Chemical Co., Ltd.); and nonylphenol EO modified acrylate (M166 manufactured by Miwon Specialty Chemical Co., Ltd.).

Examples of the additional polymerizable oligomer include epoxy acrylate oligomers, aliphatic urethane acrylate oligomers, aromatic urethane acrylate oligomers, polyester acrylate oligomers, and straight-chain acrylic oligomers.

(Cationic Polymerizable Compound)

The cationic polymerizable compound can be an epoxy compound, a vinyl ether compound, and an oxetane compound, etc. These cationic polymerizable compounds may be contained in the actinic radiation-curable inkjet ink either singly or in combination.

The epoxy compound is aromatic epoxide, alicyclic epoxide, and aliphatic epoxide. Aromatic epoxide and alicyclic epoxide are preferable in view of enhancing curability.

The aromatic epoxide can be di- or polyglycidyl ether, which is obtained by reacting polyhydric phenol or an alkylene oxide adduct thereof with epichlorohydrin. Examples of the polyhydric phenol or the alkylene oxide adduct thereof to be reacted include bisphenol A and alkylene oxide adducts thereof. The alkylene oxide in the alkylene oxide adduct can be ethylene oxide, and propylene oxide.

The alicyclic epoxide can be a cycloalkane oxide-containing compound, which is obtained by epoxidizing a cycloalkane-containing compound with an oxidizing agent such as hydrogen peroxide or peracid. The cycloalkane in the cycloalkane oxide-containing compound can be cyclohexene or cyclopentene.

The aliphatic epoxide can be di- or polyglycidyl ether, which is obtained by reacting an aliphatic polyhydric alcohol or an alkylene oxide adduct thereof with epichlorohydrin. Examples of the aliphatic polyhydric alcohol include alkylene glycols such as ethylene glycol, propylene glycol, and 1,6-hexanediol. The alkylene oxide in the alkylene oxide adduct can be ethylene oxide and propylene oxide.

Examples of the vinyl ether compound include monovinyl ether compounds such as ethylvinyl ether, n-butylvinyl ether, isobutylvinyl ether, octadecylvinyl ether, cyclohexylvinyl ether, hydroxybutylvinyl ether, 2-ethylhexylvinyl ether, cyclohexane dimethanol monovinyl ether, n-propylvinyl ether, isopropylvinyl ether, isopropenyl ether-o-propylene carbonate, dodecylvinyl ether, diethylene glycol monovinyl ether, and octadecylvinyl ether; and di- or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexane dimethanol divinyl ether, and trimethylolpropane trivinyl ether. Of these vinyl ether compounds, di- or trivinyl ether compounds are preferable in light of curability and adhesion.

The oxetane compound refers to a compound having an oxetane ring. Examples thereof include oxetane compounds described in Japanese Patent Application Laid-Open Nos. 2001-220526, 2001-310937, and 2005-255821. Specific examples thereof include a compound represented by Formula (1) described in the paragraph [0089] of Japanese Patent Application Laid-Open No. 2005-255821, a compound represented by Formula (2) described in the paragraph [0092] thereof, a compound represented by Formula (7) described in the paragraph [0107] thereof, a compound represented by Formula (8) described in the paragraph [0109] thereof, and a compound represented by Formula (9) described in the paragraph [0116] thereof. Formulas (1), (2), (7), (8) and (9) described in Japanese Patent Application Laid-Open No. 2005-255821 are shown below.

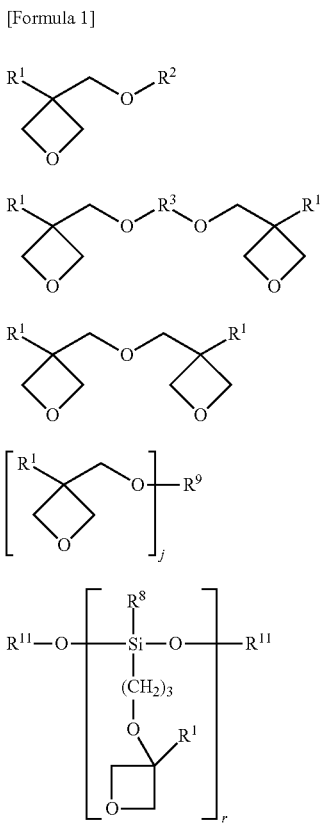

[Formula 1]

General Formula 1
General Formula 2
General Formula 7
General Formula 8
General Formula 9

The content of the photocurable compound in the actinic radiation-curable inkjet ink may be arbitrary as long as the effects according to the present invention are exhibited, but is preferably from 1 to 97 mass %, and more preferably from 30 to 95 mass % in the total mass of the actinic radiation-curable inkjet ink.

[Photopolymerization Initiator]

The actinic radiation-curable inkjet ink for use in the inkjet recording process according to the present invention contains a photopolymerization initiator.

The photopolymerization initiator can be a radical polymerization initiator when the photocurable compound is a radical polymerizable compound, and can be a photoacid-generating agent when the photocurable compound is a cationic polymerizable compound.

The radical polymerization initiator includes an intramolecular bond cleaving type and an intramolecular hydrogen withdrawing type. Examples of the intramolecular bond cleaving type photopolymerization initiator include acetophenones such as diethoxy acetophenone, 2-hydroxy-2-methyl-1-phenyl propan-1-one, benzyl dimethyl ketal, 1-(4-isopropyl phenyl)-2-hydroxy-2-methyl propan-1-one, 4-(2-hydroxy ethoxy) phenyl-(2-hydroxy-2-propyl) ketone, 1-hydroxy cyclohexyl phenyl ketone, 2-methyl-2-morpholino-(4-thio methylphenyl) propan-1-one, and 2-benzyl-2-dimethylamino-1-(4-morpholino phenyl)-butanone; benzoins such as benzoin, benzoin methyl ether and benzoin isopropyl ether; acyl phosphine oxides such as 2,4,6-trimethyl benzoin diphenyl phosphine oxide; benzil, and methylphenyl glyoxy ester.

Examples of the intramolecular hydrogen withdrawing type photopolymerization initiator include benzophenones such as benzophenone, o-benzoyl benzoic acid methyl-4-phenyl benzophenone, 4,4'-dichloro benzophenone, hydroxy benzophenone, 4-benzoyl-4'-methyldiphenyl sulfide, acrylated benzophenone, 3,3',4,4'-tetra-(t-butyl peroxy carbonyl) benzophenone; and 3,3'-dimethyl-4-methoxy benzophenone; thioxanthones such as 2-isopropyl thioxanthone, 2,4-dimethyl thioxanthone, 2,4-diethyl thioxanthone, and 2,4-dichloro thioxanthone; aminobenzophenones such as Michler's ketone and 4,4'-diethylaminobenzophenone; 10-butyl-2-chloro acridone, 2-ethyl anthraquinone, 9,10-phenanthrene quinone and camphor quinone.

When the photopolymerization initiator is acylphosphine oxide or acyl phosphonate, sensitivity is satisfactory. Specific examples of the preferred photopolymerization initiator include bis(2,4,6-trimethylbenzoyl)-phenylphosphine oxide and bis(2,6-dimethoxybenzoyl)-2,4,4-trimethyl-pentylphosphine oxide.

The content of the photopolymerization initiator in the actinic radiation-curable inkjet ink may vary depending on light for irradiation during ink curing and the type of the photocurable compound, and may be arbitrary as long as the effects according to the present invention are exhibited, but is preferably from 0.1 mass % to 10 mass %, and more preferably from 2 to 8 mass % in the total mass of the actinic radiation-curable inkjet ink.

Examples of the photoacid generating agent include compounds used for chemical amplification type photoresists or photo-cationic polymerization (refer to pages 187 to 192 of "Imaging Yo Yuki Zairyo (Organic Materials Used for Imaging Applications)" edited by The Japanese Research Association for Organic Electronics Materials published by Bunshin Publishing (1993)).

If necessary, the actinic radiation-curable inkjet ink for use in the inkjet recording process according to the present invention may further contain a photopolymerization initiator auxiliary agent, a polymerization inhibitor, or the like. The photopolymerization initiator auxiliary agent may be a tertiary amine compound and is preferably an aromatic tertiary amine compound. Examples of the aromatic tertiary amine compound include N,N-dimethylaniline, N,N-diethylaniline, N,N-dimethyl-p-toluidine, N,N-dimethylamino-p-benzoic acid ethyl ester, N,N-dimethylamino-p-benzoic acid isoamyl ethyl ester, N,N-dihydroxy ethylaniline, triethylamine, and N,N-dimethyl hexylamine. Among them, N,N-dimethylamino-p-benzoic acid ethyl ester and N,N-dimethylamino-p-benzoic acid isoamyl ethyl ester are preferable. These compounds may be contained in the actinic radiation-curable inkjet ink either singly or in combination.

Examples of the polymerization inhibitor include (alkyl) phenol, hydroquinone, catechol, resorcin, p-methoxyphenol, t-butyl catechol, t-butyl hydroquinone, pyrogallol, 1,1-picrylhydrazyl, phenothiazine, p-benzoquinone, nitrosobenzene, 2,5-di-t-butyl-p-benzoquinone, dithiobenzoyl disulfide, picric acid, cupferrone, aluminum N-nitrosophenyl hydroxylamine, tri-p-nitrophenylmethyl, N-(3-oxyanilino-1,3-dimethylbutylidene)aniline oxide, dibutyl cresol, cyclohexanone oxime cresol, guaiacol, o-isopropylphenol, butyraldoxime, methyl ethyl ketoxime, and cyclohexanone oxime.

[Colorant]

The actinic radiation-curable inkjet ink for use in the inkjet recording process according to the present invention may further contain a colorant. The colorant can be a dye or a pigment. A pigment is more preferable because it has satisfactory dispersibility in ink constituents and is excellent in weather resistance.

The dye can be an oil soluble dye. Examples of the oil soluble dye include the following various dyes. Examples of magenta dye include MS Magenta VP, MS Magenta HM-1450, HM Magenta HSo-147 (all manufactured by Mitsui-Toatsu Chemicals), AIZEN SOT Red-1, AIZEN SOT Red-2, AIZEN SOT Red-3, AIZEN SOT Pink-1, SPIRON Red GEH SPECIAL (all manufactured by Hodogaya Chemical), RESOLIN Red FB 200%, MACROLEX Red Violet R, MACROLEX ROT5B (all manufactured by of Bayer Japan), KAYASET Red B, KAYASET Red 130, KAYASET Red 802 (all manufactured by Nippon Kayaku), PHLOXIN, ROSE BENGAL, ACID Red (all manufactured by Daiwa Kasei), HSR-31, DIARESIN Red K (all manufactured by Mitsubishi-Kasei), and Oil Red (manufactured by BASF Japan).

Examples of cyan dye include MS Cyan HM-1238, MS Cyan HSo-16, HM Cyan HSo-144, MS Cyan VPG (all manufactured by Mitsui-Toatsu Chemical), AIZEN SOT Blue-4 (manufactured by Hodogaya Chemical Company), RESOLIN BR, Blue BGLN 200%, MACROLEX Blue RR, CERES Blue GN, SIRIUS SUPRA TURQ Blue Z-BGL, SIRIUS SUPRA TURQ Blue FB-LL 330% (all manufactured by Bayer Japan), KAYASET Blue FR, KAYASET Blue N, KAYASET Blue 814, Turq. Blue GL-5 200, Light Blue BGL-5 200 (all manufactured by Nippon Kayaku), DAIWA Blue 7000, Oleosol Fast Blue GL (all manufactured by Daiwa Kasei), DIARESIN Blue P (manufactured by Mitsubishi-Kasei), SUDAN Blue 670, NEOPEN Blue 808, and ZAPON Blue 806 (all manufactured by BASF Japan).

Examples of yellow dye include MS Yellow HSm-41, Yellow KX-7, Yellow EX-27 (manufactured by Mitsui-Toatsu Chemical), AIZEN SOT Yellow-1, AIZEN SOT Yellow-3, AIZEN SOT Yellow-6 (all manufactured by Hodogaya Chemical), MACROLEX Yellow 6G, MACROLEX FLUOR Yellow 10GN (all manufactured by Bayer Japan), KAYASET Yellow SF-G, KAYASET Yellow 2G, KAYASET Yellow A-G, KAYASET Yellow E-G (all manufactured by Nippon Kayaku), DAIWA Yellow 330HB (manufactured by of Daiwa Kasei), HSY-68 (manufactured by Mitsubishi-Kasei), SUDAN Yellow 146, and NEOPEN Yellow 075 (all manufactured by BASF Japan).

Examples of black dye include MS Black VPC (manufactured by Mitsui-Toatsu Chemical), AIZEN SOT Black-1, AIZEN SOT Black-5 (all manufactured by Hodogaya Chemical), RESORIN Black GSN 200%, RESOLIN Black BS (all manufactured by Bayer Japan), KAYASET A-N (manufactured by Nippon Kayaku), DAIWA Black MSC (manufactured by Daiwa Kasei), HSB-202 (manufactured by Mitsubishi-Kasei), NEPTUNE Black X60, and NEOPEN Black X58 (all manufactured by BASF Japan).

The pigment is not particularly limited and can be, for example, an organic pigment or an inorganic pigment of any of the following numbers described in the color index.

Examples of red or magenta pigment include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, and 257, Pigment Violet 3, 19, 23, 29, 30, 37, 50, and 88, and Pigment Orange 13, 16, 20, and 36. Examples of blue or cyan pigment include Pigment Blue 1, 15, 15:1, 15:2, 15:3, 15:4, 15:6, 16, 17-1, 22, 27, 28, 29, 36, and 60. Examples of green pigment include Pigment Green 7, 26, 36, and 50. Examples of yellow pigment include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, and 193. Examples of black pigment include Pigment Black 7, 28, and 26.

Examples of commercially available products of the pigment include Chromo Fine Yellow 2080, 5900, 5930, AF-1300, and 2700L, Chromo Fine Orange 3700L and 6730, Chromo Fine Scarlet 6750, Chromo Fine Magenta 6880, 6886, 6891N, 6790, and 6887, Chromo Fine Violet RE, Chromo Fine Red 6820 and 6830, Chromo Fine Blue HS-3, 5187, 5108, 5197, 5085N, SR-5020, 5026, 5050, 4920, 4927, 4937, 4824, 4933GN-EP, 4940, 4973, 5205, 5208, 5214, 5221, and 5000P, Chromo Fine Green 2GN, 2GO, 2G-550D, 5310, 5370, and 6830, Chromo Fine Black A-1103, Seika Fast Yellow 10GH, A-3, 2035, 2054, 2200, 2270, 2300, 2400(B), 2500, 2600, ZAY-260, 2700(B), and 2770, Seika Fast Red 8040, C405(F), CA120, LR-116, 1531B, 8060R, 1547, ZAW-262, 1537B, GY, 4R-4016, 3820, 3891, and ZA-215, Seika Fast Carmine 6B1476T-7, 1483LT, 3840, and 3870, Seika Fast Bordeaux 10B-430, Seika Light Rose R40, Seika Light Violet B800 and 7805, Seika Fast Maroon 460N, Seika Fast Orange 900 and 2900, Seika Light Blue C718 and A612, and Cyanine Blue 4933M, 4933GN-EP, 4940, and 4973 (all manufactured by Dainichiseika Colour & Chemicals Mfg. Co., Ltd.);

KET Yellow 401, 402, 403, 404, 405, 406, 416, and 424, KET Orange 501, KET Red 301, 302, 303, 304, 305, 306, 307, 308, 309, 310, 336, 337, 338, and 346, KET Blue 101, 102, 103, 104, 105, 106, 111, 118, and 124, and KET Green 201 (all manufactured by DIC Corporation);

Colortex Yellow 301, 314, 315, 316, P-624, 314, U10GN, U3GN, UNN, UA-414, and U263, Finecol Yellow T-13 and T-05, Pigment Yellow 1705, Colortex Orange 202, Colortex Red 101, 103, 115, 116, D3B, P-625, 102, H-1024, 105C, UFN, UCN, UBN, U3BN, URN, UGN, UG276, U456, U457, 105C, and USN, Colortex Maroon 601, Colortex Brown B610N, Colortex Violet 600, Pigment Red 122, Colortex Blue 516, 517, 518, 519, A818, P-908, and 510, Colortex Green 402 and 403, and Colortex Black 702 and U905 (all manufactured by Sanyo Color Works, LTD.);

Lionol Yellow 1405G, and Lionol Blue FG7330, FG7350, FG7400G, FG7405G, ES, and ESP-S (all manufactured by Toyo Ink Co., Ltd.);

Toner Magenta E02, Permanent Rubin F6B, Toner Yellow HG, Permanent Yellow GG-02, and Hostapeam Blue B2G (all manufactured by Hoechst Industry Ltd.);

Novoperm P-HG, Hostaperm Pink E, and Hostaperm Blue B2G (all manufactured by Clariant (Japan) K.K.); and Carbon Black #2600, #2400, #2350, #2200, #1000, #990, #980, #970, #960, #950, #850, MCF88, #750, #650, MA600, MA7, MA8, MA11, MA100, MA100R, MA77, #52, #50, #47, #45, #45L, #40, #33, #32, #30, #25, #20, #10, #5, #44, and CF9 (all manufactured by Mitsubishi Chemical Company).

The average particle size of the pigment is preferably from 0.08 to 0.5 μm. The maximum particle size of the pigment is preferably from 0.3 to 10 μm, and more preferably from 0.3 to 3 μm. By controlling the particle size of the pigment, clogging in the nozzles of the inkjet recording head can be avoided, and ink storage stability, ink transparency, curing sensitivity can be maintained.

The content of the pigment or dye is preferably from 0.1 to 20 mass %, and more preferably from 0.4 to 10 mass % relative to the actinic radiation-curable inkjet ink. If the content of the pigment or dye is excessively low, color exhibition of an image to be obtained is insufficient. On the other hand, if it is excessively high, the ink viscosity is increased to lower the jetting ability.

Dispersing of the pigment can be performed by using ball mill, sand mill, attritor, roll mill, agitator, HENSCHEL MIXER, colloid mill, ultrasound homogenizer, pearl mill, wet jet mill, or paint shaker, for example. Dispersing of the pigment is preferably performed such that the average particle size of the pigment particles is preferably from 0.08 to 0.5 μm and the maximum particle size is preferably from 0.3 to 10 μm, and more preferably from 0.3 to 3 μm. Dispersing of the pigment is controlled by the selection of the pigment, a dispersant, and a dispersion medium, dispersion conditions, and filtration conditions, etc.

In order to enhance the dispersibility of the pigment, the actinic radiation-curable inkjet ink may further contain a dispersant. Examples of the dispersant include hydroxyl group-containing carboxylic acid esters, salts of long chain polyaminoamides and high molecular weight acid esters, salts of high molecular weight polycarboxylic acids, salts of long chain polyaminoamides and polar acid esters, high molecular weight unsaturated acid esters, high molecular weight copolymers, modified polyurethane, modified polyacrylate, anionic surfactants of polyether ester type, naphthalenesulfonic acid-formalin condensate salts, aromatic sulfonic acid-formalin condensate salts, polyoxyethylene alkyl phosphoric acid esters, polyoxyethylene nonyl phenyl ether, and stearylamine acetate. Examples of commercially available products of the dispersant include SOLSPERSE series of Avecia Biotechnology, Inc., and PB series of Ajinomoto Fine-Techno Co., Inc.

If necessary, the actinic radiation-curable inkjet ink may further contain a dispersion promotor. The dispersion promotor can be selected according to the pigment.

The total amount of a dispersant and a dispersion promoter is preferably from 1 to 50 mass % relative to the weight of pigment.

If necessary, the actinic radiation-curable inkjet ink may further contain a dispersion medium for dispersing the pigment. A solvent may be contained as the dispersion medium in the ink. However, for preventing the solvent from remaining in a formed image, it is preferable that the dispersion medium should be any of the photocurable compounds (in particular, low viscous monomers) as descried above.

[Additional Components]

If necessary, the actinic radiation-curable inkjet ink may further contain additional component(s). Additional components can be an additional colorant such as a pigment other than the carbon black, various additives and other resins. Examples of the additives include surfactants, leveling agents, matting agents, UV absorbers, IR absorbers, antibacterial agents, and basic compounds that serve to increase the storage stability of the ink. Examples of the basic compounds include basic alkali metal compounds, basic alkali earth metal compounds, and basic organic compounds such as amines Examples of other resins include resins for adjusting the physical properties of a cured film; examples thereof include polyester resins, polyurethane resins, vinyl resins, acrylic resins, rubber resins, and waxes.

[Method for Preparing Actinic Radiation-Curable Inkjet Ink]

The actinic radiation-curable inkjet ink for use in the inkjet recording process according to the present invention is obtained by mixing at least a gelling agent, a photocurable compound, and a photopolymerization initiator, and, if necessary, a colorant under heating. Preferably, a pigment dispersant containing a colorant (in particular, pigment) dispersed in part of the photocurable compound is prepared and then mixed with other ink components. The obtained actinic radiation-curable inkjet ink is preferably filtered through a predetermined filter.

2. Inkjet Recording Apparatus

The inkjet recording apparatus according to the present invention is an apparatus using the inkjet recording process according to the present invention.

The inkjet recording apparatus according to the preferable aspect of the present invention includes: a landing section where the actinic radiation-curable inkjet ink is landed on the recording medium; an irradiation section where the ink landed on the recording medium is irradiated with actinic radiation; a temperature-adjusting mechanism A; and a temperature-adjusting mechanism B, wherein: the temperature-adjusting mechanism A is configured such that a temperature of the actinic radiation-curable inkjet ink at the landing section is adjusted to be $T_2$ (° C.); and the temperature-adjusting mechanism B is configured such that a temperature of the actinic radiation-curable inkjet ink at the irradiation section is adjusted to be $T_3$ (° C.).

In the inkjet recording apparatus according to the present invention, the temperature-adjusting mechanism A and the temperature-adjusting mechanism B may be disposed either continuously or discontinuously, but are preferably disposed discontinuously.

The inkjet recording apparatus according to the present invention includes line recording type (single pass recording type) and serial recording type. Although it may be suitably selected for the inkjet recording apparatus according to the present invention depending on desired resolution of the image or recording speed, the line recording type (single pass recording type) is preferred from the viewpoint of high speed recording.

Hereinafter, the inkjet recording apparatus of line recording type (single pass recording type) according to the present invention will be described in detail with reference to FIGS. 1 to 4. The inkjet recording apparatus of line recording type (single pass recording type) according to the present invention is not limited to the aspects of the inkjet recording apparatus of line recording type (single pass recording type) illustrated in FIGS. 1 to 4 within the range that does not deviate from the object and gist of the present invention.

FIG. 1 includes a side view and a top view schematically illustrating inkjet recording apparatus 10 which is one aspect of the inkjet recording apparatus according to the present invention. Inkjet recording apparatus 10 illustrated in FIG. 1 has head carriages 130 to 133 for accommodating inkjet recording heads 140 to 143 for a yellow ink, a magenta ink, a cyan ink, and a black ink respectively, ink channels 120 to 123 connected to head carriages 130 to 133 respectively, ink tanks 110 to 113 for storing the inks to be fed via ink channels 120 to 123, UV light source 150 which covers the entire width of recording medium 160 and which is disposed at a downstream side of head carriages 130 to 133 (conveyance direction of the recording medium), a temperature-adjusting mechanism A disposed on a backside of recording medium 160, a temperature-adjusting mechanism B, a landing section where the actinic radiation-curable inkjet ink is landed on the recording medium, and an irradiation section where the ink landed on the recording medium is irradiated with actinic radiation.

Head carriages 130 to 133 are fixedly disposed so as to cover the entire width of recording medium 160 and accommodate a plurality of inkjet recording heads 140 to 143 provided for each color (yellow ink, magenta ink, cyan ink, and black ink). Ink jet recording heads 140 to 143 are designed to receive the inks. For example, an ink can be supplied directly from a non-illustrated ink cartridge or the like that is added in a freely-mountable manner to inkjet recording apparatus 10 or by non-illustrated means for ink supply.

A plurality of inkjet recording heads 140 to 143 is disposed for each color in the conveyance direction of recording medium 160. The number of respective inkjet recording heads 140 to 143 that are disposed in the conveyance direction of recording medium 160 is determined based on the nozzle density of inkjet recording heads 140 to 143 and the resolution of a printed image. For example, when an image having the resolution of 1,440 dpi is formed by using inkjet recording heads 140 to 143 with a drop volume of 2 pl and a nozzle density of 360 dpi, four inkjet recording heads 140 to 143 can be disposed in a staggered manner relative to the conveyance direction of recording medium 160. Further, when an image having the resolution of 720×720 dpi is formed by using inkjet recording heads 140 to 143 with a drop volume of 6 pl and a nozzle density of 360 dpi, two of inkjet recording heads 140 to 143 can be arranged in a staggered manner. As described herein, dpi represents the number of liquid droplets (dots) per 2.54 cm.

Ink tanks 110 to 113 are connected to head carriages 130 to 133 via ink channels 120 to 123. Ink channels 120 to 123 are passages for supplying an ink in ink tanks 110 to 113 to head carriages 130 to 133. For stable discharge of ink droplets, the ink present in ink tanks 110 to 113, ink channels 120 to 123, head carriages 130 to 133, and inkjet recording heads 140 to 143 is heated to a predetermined temperature to maintain the gel state.

At the landing section where the actinic radiation-curable inkjet ink is landed on a recording medium, the temperature of the actinic radiation-curable inkjet ink is adjusted by the temperature-adjusting mechanism A and the ink temperature becomes $T_2$ (° C.). The temperature-adjusting mechanism A is, for example, a heater, a drum, or the like.

UV light source 150 covers the entire width of recording medium 160 and it is disposed at a downstream side of head carriages 130 to 133 relative to the conveyance direction of recording medium 160. Further, UV light source 150 irradiates, with light, the liquid droplets which have been discharged from inkjet recording heads 140 to 143 and landed on recording medium 160 to cure the liquid droplets. At the irradiation section where the actinic radiation-curable inkjet ink landed on the recording medium is irradiated with actinic radiation, the temperature of the actinic radiation-curable inkjet ink is adjusted by the temperature-adjusting mechanism B and the ink temperature at the irradiation section becomes $T_3$ (° C.). The temperature-adjusting mechanism B is, for example, a heater, a drum, a fan for air cooling, or the like.

Figure 2:
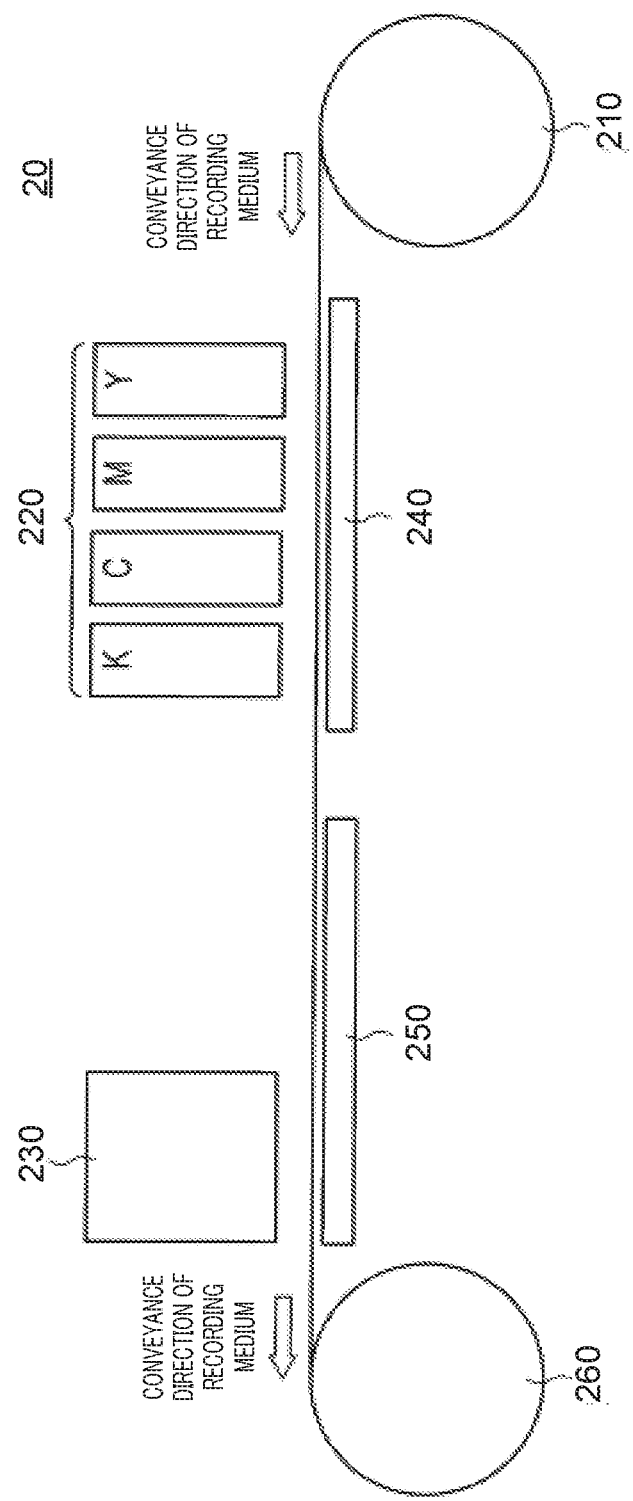
FIG. 2 is a side view illustrating one example of a configuration of the main part of inkjet recording apparatus 20 which is one aspect of an inkjet recording apparatus according to the present invention.

FIG. 2 is a side view illustrating one example of a configuration of the main part of inkjet recording apparatus 20 which is one aspect of the inkjet recording apparatus according to the present invention. Inkjet recording apparatus 20 illustrated in FIG. 2 includes sheet feed section 210, inkjet recording section 220, UV light source 230, heater 240, cooling section 250, and winding section 260.

Figure 3:
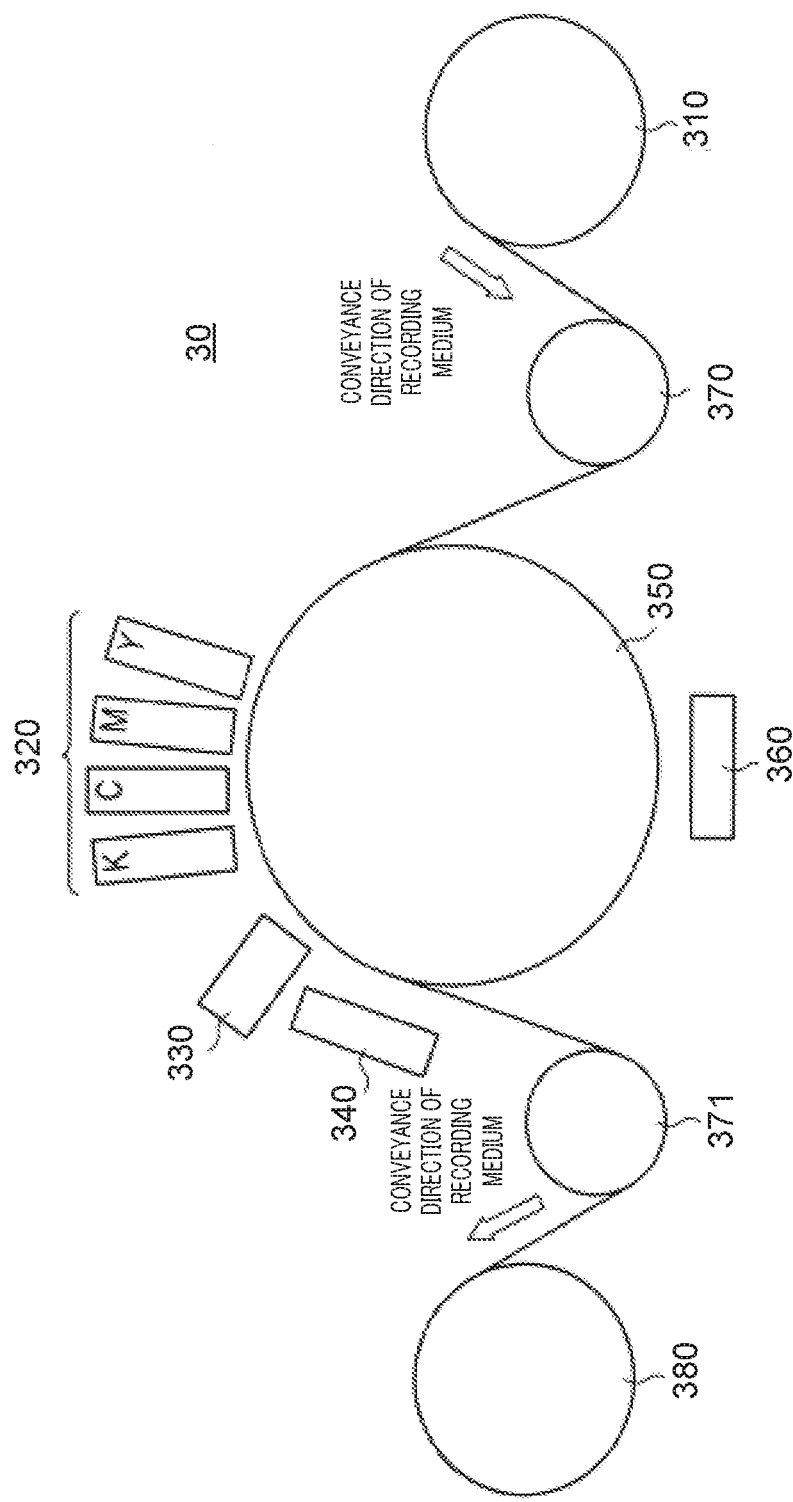
FIG. 3 is a side view illustrating one example of a configuration of the main part of inkjet recording apparatus 30 which is one aspect of an inkjet recording apparatus according to the present invention.

FIG. 3 is a side view illustrating one example of a configuration of the main part of inkjet recording apparatus 30 which is one aspect of the inkjet recording apparatus according to the present invention. Inkjet recording apparatus 30 illustrated in FIG. 3 includes sheet feed section 310, inkjet recording section 320, air cooling fan 330, UV light source 340, heating drum 350, temperature-adjusting heater 360, conveyance roller 370, 371, and winding section 380.

Figure 4:
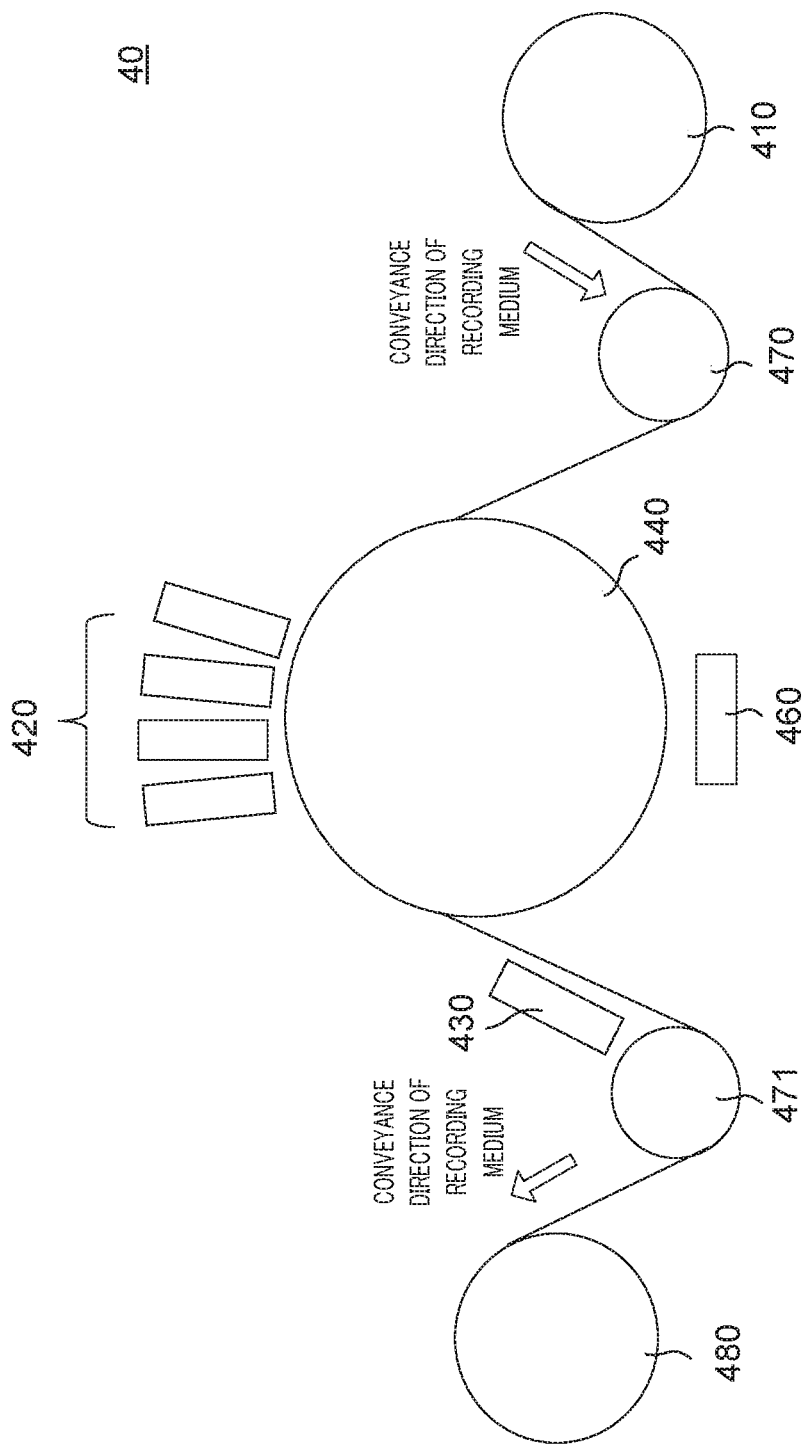
FIG. 4 is a side view illustrating one example of a configuration of the main part of inkjet recording apparatus 40 which is one aspect of an inkjet recording apparatus according to the present invention.

FIG. 4 is a side view illustrating one example of a configuration of the main part of inkjet recording apparatus 40 which is one aspect of the inkjet recording apparatus according to the present invention. Inkjet recording apparatus 40 illustrated in FIG. 4 includes sheet feed section 410, inkjet recording section 420, UV light source 430, heating drum 440, temperature-adjusting heater 460, conveyance roller 470, 471, and winding section 480.

Inkjet recording apparatuses of FIGS. 2 to 4 are examples of the recording apparatus provided with a mechanism of adjusting the ink temperature at the time of landing of the ink and at the time of UV exposure. The ink is discharged at the inkjet recording section onto a recording medium fed from the sheet feed section. The ink temperature at this time is controlled by a heater or a heating drum as illustrated in FIGS. 2 to 4. The ink temperature at the time of UV exposure may be controlled by a cooling section where a metal plate is cooled by a chiller or the like as illustrated in FIG. 2, by a fan for blowing cold air as illustrated in FIG. 3, or by natural air cooling performed apart from a heating drum as illustrated in FIG. 4. The ink temperature may be controlled by any form of temperature control system as long as the temperature at the time of landing of the ink and at the time of UV exposure can be precisely controlled. The total film thickness of the ink droplet after curing is preferably from 2 to 25 μm. The term "total film thickness of the ink droplet" refers to a maximum value of the film thickness of the ink droplet drawn on a recording medium.

Examples

Hereinafter, the present invention will be described in more detail with reference to Examples, but it is not understood that the scope of the present invention is limited to Examples.

[Preparation of Pigment Dispersion]

A pigment dispersion was prepared according to the procedures described below. The two compounds described below were put into a stainless beaker and heated at 65° C. on a hot plate under stirring for dissolution for 1 hour.

PB824 (manufactured by Ajinomoto Fine-Techno Co., Inc.) 9 parts by weight

Tripropylene glycol diacrylate (APG-200 manufactured by Shin-Nakamura Chemical Co., Ltd.) 71 parts by weight After the resulting mixed solution was cooled to room temperature, 20 parts by weight of Pigment Black 7 (manufactured by Mitsubishi Chemical Corporation, #52) was added as a pigment thereto, and put and sealed together with 200 g of zirconia beads having a diameter of 0.5 mm into a glass bottle. After dispersion for 5 hours using a paint shaker, the zirconia beads were removed.

[Preparation of Inks]

Components given below and the pigment dispersion were mixed according to the ink compositions described below in Table 2 and stirred under heating at 80° C. Each of obtained solutions was filtered through a 3 μm Teflon® membrane filter manufactured by ADVANTEC under heating to obtain inks 1 to 5. The unit of components in Tables is mass %.

Gelling Agent Having Molecular Weight of Less than 800 and Having C Log P of 6.0 or More Distearyl ketone (Kao Wax T1: manufactured by Kao Corporation, molecular weight: 520, C log P: 15 or more)

Behenyl behenate (UNISTAR M-2222SL: manufactured by NOF Corporation, molecular weight: 648, C log P: 15 or more)

Palmitic acid amide (DIAMID KP: manufactured by Nippon Kasei Chemical Co., Ltd., molecular weight 255, C log P: 6.3)

Additional Gelling Agent
N-lauroyl-L-glutamic acid dibutylamide (LGBA: manufactured by Wako Pure Chemical Industries, Ltd., molecular weight: 439, C log P: 5.4)
(Meth)Acrylate Compound A
3PO modified trimethylolpropane triacrylate (Miramer M30: manufactured by Miwon Specialty Chemical Co., Ltd., molecular weight: 471, C log P: 4.9)
Additional Photocurable Compound
Polyethylene glycol #400 diacrylate (NK ester A-400: manufactured by Shin-Nakamura Chemical Co., Ltd., molecular weight: 508, C log P: 0.5)
6EO modified trimethylolpropane triacrylate (SR499: manufactured by SARTOMER Company, molecular weight 560, C log P: 3.6)
Polymerization Initiator
Irgastab UV10: manufactured by BASF SE
Photopolymerization Initiator
TPO: manufactured by BASF SE
Irg819 manufactured by BASF SE
Surfactant
KF-352: manufactured by Shin-Etsu Chemical Co., Ltd.
[Evaluation of Inks]
(Dissolution Stability of Gelling Agents)
A dissolution state after each of the inks was left to stand at 100° C. for 4 hours was visually observed.
A: Separation and precipitation are not observed.
C: Oils gather at the surface (phase separation occurs).

recording head, filter-attached piping, and a piezo head, and the area from the ink tank to the recording head was warmed to 100° C.

Further, the temperature of a recording conveyor was controlled using a temperature-adjusting mechanism such that the ink temperature $T_2$ (° C.) at the time of landing of the ink and the ink temperature $T_3$ (° C.) at the time of ultraviolet irradiation become the values described below in Table 3. The ink temperature at the ink-landing region (landing section) and the ink temperature at the ultraviolet irradiation region (irradiation section) are equivalent to the surface temperature of a recording medium at the ink-landing region (landing section) and the surface temperature of a recording medium at the ultraviolet irradiation region (irradiation section), respectively. The surface temperature of a recording medium was measured in a state where the recording medium for use in image printing was conveyed at the same conveyance speed as that when the image printing was actually performed on the recording medium using a noncontact thermometer (PT-7LD manufactured by OPTEX CO., LTD).

A voltage was applied to the piezo head so as to make droplets 2 pl, the ink was discharged using four 360 dpi resolution heads to form: a monochrome solid image having a resolution of 1,440×1,440 dpi; black characters with a 3-point Ming-style typeface; and white characters (outline characters in solid image) with a 3-point Ming-style type-

TABLE 2

| | Type of compound | Product name | Manufacturer | Molecular weight | C log P value | Ink 1 | Ink 2 | Ink 3 | Ink 4 | Ink 5 |
|---|---|---|---|---|---|---|---|---|---|---|
| Gelling agent | Distearyl ketone | Kao Wax T1 | Kao | 520 | >15 | 3.0% | 3.0% | | | |
| | Behenyl behenate | UNISTAR M-2222SL | NOF | 648 | >15 | 1.0% | | | | |
| | Palmitic acid amide | DIAMID KP | Nippon Kasei | 255 | 6.3 | | | | 5.0% | |
| | N-lauroyl-L-glutamic acid dibutylamide | LGBA | Wako Pure Chemical | 439 | 5.4 | | | | | 2.0% |
| (Meth)acrylate A | 3PO modified trimethylolpropane triacrylate | Miramer M360 | Miwon | 471 | 4.9 | 15.0% | 15.0% | 30.0% | 15.0% | 15.0% |
| Additional photocurable compound | Polyethylene glycol #400 diacrylate | A-400 | Shin-Nakamura Chemical | 508 | 0.5 | 20.0% | 20.0% | 10.0% | 20.0% | 20.0% |
| | 6EO modified trimethylolpropane triacrylate | SR499 | SARTOMER | 560 | 3.6 | 36.8% | 37.8% | 30.8% | 38.8% | 40.8% |
| Polymerization inhibitor | Polymerization inhibitor | Irgastab UV10 | BASF | — | — | 0.1% | 0.1% | 0.1% | 0.1% | 0.1% |
| Photopolymerization initiator | — | TPO | BASF | — | — | 6.0% | 6.0% | 6.0% | 6.0% | 6.0% |
| Photopolymerization initiator | — | 819 | BASF | — | — | 3.0% | 3.0% | 3.0% | 3.0% | 3.0% |
| Surfactant | — | KF-352 | Shin-Etsu Chemical | — | — | 0.1% | 0.1% | 0.1% | 0.1% | 0.1% |
| | Pigment dispersion | | — | — | — | 15.0% | 15.0% | 15.0% | 15.0% | 15.0% |
| | Total | — | — | — | — | 100.0% | 100.0% | 100.0% | 100.0% | 100.0% |
| | Dissolution stability of gelling agent | — | — | — | — | A | A | A | A | — |

[Inkjet Image Forming Method]

Each of the ink compositions prepared in Examples and Comparative Examples was loaded on an inkjet recording apparatus including inkjet recording heads each provided with piezo type inkjet nozzles. The inkjet recording apparatus provided with a temperature-adjusting mechanism as illustrated in FIG. 1 such that the ink temperature at an ink-landing region and at an ultraviolet irradiation region can be controlled was used.

An ink supplying system included an ink tank, an ink channel, a sub ink tank immediately before the inkjet face onto A4 size coated paper (OK KINFUJI, basis weight: 104.7 g/m$_2$, manufactured by Oji Paper Co., Ltd.).

After printing, the ink was irradiated and cured with light from an LED lamp (395 nm, 8 W/cm$^2$, water cooled unit) manufactured by Phoseon Technology. The distance from the lamp to the face of the recording medium was set to be 20 mm, and the conveyance speed of the recording medium was set to be 40 m/s (light quantity: 300 mJ/cm$^2$). The light quantity was measured using a UV power meter (C9536, H9958 manufactured by Hamamatsu Photonics K. K.).

[Evaluation of Images]
(White Streak and Blank)

Whether a white streak (liquid gathering due to insufficient pinning causes combining of dots) and a blank (insufficient levelling due to excessive pinning) existed or not in the solid image portion was visually checked for the output images printed with each ink.

A: A white streak and a blank do not exist.
B: One or two white streaks or blanks exist, but the level causes no problem in practical use.
C: A lot of white streaks or blanks occur.

(Curability)

The output image (monochrome solid image) printed with each ink was rubbed 30 strokes with coated paper on which a load of 500 g was applied, and thereafter the image surface was visually evaluated.

A: No change is recognized in the image.
C: Image density is remarkably lowered.

(Glossiness)

The glossiness of the image immediately after printing was measured with a glossmeter, the image was then stored in a thermo at 40° C. for 1 month, and thereafter the glossiness at the same point was measured again to evaluate the change in the glossiness value before and after storage.

A: The change in the glossiness value before and after storage is less than ±5%.
B: The change in the glossiness value before and after storage is ±5% or more and less than 10% and causes no problem in practical use.
C: The change in the glossiness value before and after storage is ±10% or more and is a practically intolerable level.

(Solubility of Gelling Agents)

As for inks 1 to 5 in Table 2 above, components excluding the pigment dispersion in each of inks 1 to 5 were mixed according to the level given in Table 2 to prepare 100 g of a mixture, the resultant mixture was then stirred and mixed at 80° C. to be dissolved completely, and thereafter the resultant solution was set to a predetermined temperature given in Table 3 ($T_2$ (° C.) or $T_3$ (° C.)). To the solution, 0.1 g (0.1%) of the gelling agent to be added to each of inks 1 to 5 was added and stirred and mixed at the predetermined temperature. Whether the gelling agent was completely dissolved or not was visually checked, and when the gelling agent was completely dissolved, 0.1 g of the gelling agent was further added (0.2 g in total). By repeating this operation, the maximum amount of the soluble gelling agent added was determined and defined as the solubility at $T_2$ (° C.) or $T_3$ (° C.). Since the inks 1 contained one or two types of gelling agents, the amount of the gelling agents added each time was according to the ratio in the level table, and the total amount of gelling agents added was set to be 0.1 g.

(Measurement of Gelation Temperature $T_1$ (° C.))

The gelation temperatures $T_1$ (° C.) of inks 1 to 5 given above in Table 2 were found by measuring temperature changes in dynamic viscoelasticity of the inks using a rheometer. Specifically, when the inks were heated to 100° C. and cooled to 20° C. with conditions including shear rate of 11.7 (/s) and temperature decrease rate of 0.1° C./s, temperature change curves of the viscosity were obtained. The gelation temperatures were obtained as a temperature where the viscosity was 200 mPa·s in the temperature change curves of the viscosity. The results of measuring the gelation temperature $T_1$ (° C.) for inks 1 to 5 are given below in Table 3.

Evaluation results are given below in Table 3.

TABLE 3

| No. | Ink No. | $T_1$ (° C.) | $T_2$ (° C.) | $T_3$ (° C.) | Solubility at $T_2$ (° C.) | Solubility at $T_3$ (° C.) | White streak (pinning property) | Blank in solid print portion (levelling property) | Curability | Change in glossiness | |
|---|---|---|---|---|---|---|---|---|---|---|---|
| 1 | Ink 1 | 62 | 45 | 40 | 0.3% | less than 0.1% | A | A | A | A | Present invention |
| 2 |  | 62 | 45 | 30 | 0.3% | less than 0.1% | A | A | A | A | Present invention |
| 3 |  | 62 | 45 | 20 | 0.3% | less than 0.1% | A | A | A | A | Present invention |
| 4 |  | 62 | 45 | 10 | 0.3% | less than 0.1% | A | A | A | A | Present invention |
| 5 |  | 62 | 45 | 45 | 0.3% | 0.3% | A | A | A | C | Comparative Example |
| 6 |  | 62 | 40 | 30 | less than 0.1% | less than 0.1% | A | B | A | A | Present invention |
| 7 |  | 62 | 45 | 50 | 0.3% | 0.5% | A | A | C | C | Comparative Example |
| 8 |  | 62 | 70 | 40 | 2.0% | less than 0.1% | C | A | A | A | Comparative Example |
| 9 |  | 62 | 60 | 40 | 1.2% | less than 0.1% | B | A | A | A | Present invention |
| 10 | Ink 2 | 66 | 45 | 55 | 0.5% | 0.6% | A | A | A | C | Comparative Example |
| 11 |  | 66 | 45 | 30 | 0.5% | less than 0.1% | A | A | A | A | Present invention |
| 12 | Ink 3 | 61 | 50 | 35 | 0.4% | less than 0.1% | B | A | A | A | Present invention |
| 13 |  | 61 | 50 | 40 | 0.4% | 0.2% | B | A | A | C | Comparative Example |
| 14 | Ink 4 | 48 | 35 | 30 | 0.2% | 0.2% | B | A | A | C | Comparative Example |
| 15 |  | 48 | 35 | 20 | 0.2% | less than 0.1% | B | A | A | B | Present invention |
| 16 | Ink 5 | — | 40 | 35 | — | — | C | C | C | A | Comparative Example |

From the results given above in Table 3, Nos. 1 to 4, 6, 9, 11, 12, and 15 according to the present invention gave high-quality images without a blank in the solid print portion and a white streak and showed no change in glossiness with time due to blooming.

From comparative evaluation of Nos. 1 to 5 (Nos. 1 to 4 correspond to the present invention, and No. 5 corresponds to a comparative example.), the temperature satisfying a solubility of less than 0.1% at $T_3$ (° C.) is 40° C. and the change in glossiness due to blooming cannot be prevented at 45° C. because the solubility is 0.1% or more at 45° C. Further, from comparative evaluation of No. 2 (the present invention) and No. 6 (the present invention), it is understood that the solubility at $T_2$ (° C.) is preferably higher than 0.1% from the viewpoint of the leveling property. As is the case for No. 7 (comparative example), it is understood that when the solubility at $T_3$ (° C.) is high, not only the change in glossiness with time is deteriorated but also the curability is lowered. In No. 8 (comparative example), the white streak due to liquid gathering occurred because $T_2$ (° C.) was higher than $T_1$ (° C.) and the pinning effect was not obtained. From comparative evaluation of No. 1 (the present invention) and No. 9 (the present invention), it is understood that the pinning effect is enhanced more within the range where the effects according to the present invention are not damaged in the case where the solubility at $T_2$ (° C.) is less than 1.0%

From comparative evaluation of Nos. 10 to 15 (Nos. 11 to 12 and 15 correspond to the present invention, and Nos. 10 and 13 to 14 correspond to comparative examples.), by appropriately adjusting $T_3$ (° C.) (by controlling the temperature such that the solubility of the gelling agents may be less than 0.1%), both the white streak and blank and the change in glossiness can be solved, even if they have the same ink composition. Further, from the viewpoint of the type of the gelling agent, it is understood that inks 1 and 2 using a gelling agent or gelling agents each having a molecular weight of less than 800 and having a C log P value of 6.0 or more are more satisfactory in terms of image quality. As for ink 5 not containing a gelling agent, the curability was insufficient due to the influence of oxygen inhibition and was practically intolerable.

By use of the inkjet recording apparatus using the inkjet recording process such as Nos. 1 to 4, 6, 9, 11, 12, or 15 according to the present invention, blooming is prevented while at least the leveling property and the pinning property of the actinic radiation-curable inkjet ink can be maintained, and further, printed matter which is cured by a small irradiation dose of light energy and to which image defects do not occur due to blooming with time is obtained.

INDUSTRIAL APPLICABILITY

The inkjet recording process according to the present invention is suitable for use in image forming (inkjet recording) on a recording medium using a gelling agent-containing actinic radiation-curable inkjet ink.

This application is entitled to and claims the benefit of Japanese Patent Application No. 2014-080244, filed on Apr. 9, 2014. The contents of the specification and drawings of this application are incorporated herein by reference in its entirety.

REFERENCE SIGNS LIST

10, 20, 30, 40 Inkjet recording apparatus
110 to 113 Ink tanks for yellow ink, magenta ink, cyan ink, or black ink
120 to 123 Ink channels for Head carriages for yellow ink, magenta ink, cyan ink, and black ink
130 to 133 Head carriages for yellow ink, magenta ink, cyan ink, and black ink
140 to 143 Inkjet Recording heads for yellow ink, magenta ink, cyan ink, and black ink
150 UV light source
160 Recording medium
210, 310, 410 Sheet feed section
220, 320, 420 Inkjet recording section
230, 340, 430 UV light source
240 Heater
250 Cooling section
260, 380, 480 Winding section
330 Air cooling fan
350, 440 Heating drum
360, 460 Temperature-adjusting heater
370, 371, 470, 471 Conveyance roller

The invention claimed is:
1. An inkjet recording process comprising:
   landing an actinic radiation-curable inkjet ink on a recording medium; and
   irradiating and curing the ink landed on the recording medium with actinic radiation, wherein:
   the actinic radiation-curable inkjet ink comprises at least:
      a gelling agent;
      a photocurable compound; and
      a photopolymerization initiator;
   a gelation temperature $T_1$ (° C.) of the actinic radiation-curable inkjet ink, an ink temperature $T_2$ (° C.) when the actinic radiation-curable inkjet ink is landed on the recording medium, and an ink temperature $T_3$ (° C.) when the actinic radiation-curable inkjet ink is irradiated with the actinic radiation satisfy the relation of $T_1$ (° C.)>$T_2$ (° C.)>$T_3$ (° C.), and $T_2$ (° C.)−$T_3$ (° C.)>5° C.; and
   a solubility of the gelling agent in the photocurable compound at $T_3$ (° C.) is less than 0.1 mass %.

2. The inkjet recording process according to claim 1, wherein:
   a viscosity of the actinic radiation-curable inkjet ink at the ink temperature $T_2$ (° C.) is 10 Pa·s or more and less than 1,000 Pa·s; and
   a viscosity of the actinic radiation-curable inkjet ink at the ink temperature $T_3$ (° C.) is 10 Pa·s or more and less than 10,000 Pa·s.

3. The inkjet recording process according to claim 1, wherein:
   a molecular weight of the gelling agent is less than 800, and a C log P value of the gelling agent is 6.0 or more;
   a content of the gelling agent is from 1.0 to 7.0 mass % relative to a total mass of the actinic radiation-curable inkjet ink; and
   the photocurable compound comprises a (meth)acrylate compound having a molecular weight within a range from 280 to 1,500 and a C log P value within a range from 4.0 to 7.0.

4. The inkjet recording process according to claim 1, wherein
   the gelling agent comprises at least one compound of a compound represented by the following formula (G1) and a compound represented by the following formula (G2):

$$R_1\text{—CO—}R_2; \quad \text{Formula (G1):}$$

$$R_3\text{—COO—}R_4; \quad \text{Formula (G2):}$$

wherein $R_1$ to $R_4$ each independently represent a hydrocarbon group comprising a straight-chain moiety having 12 or more carbon atoms and may further comprise a branched moiety.

5. An inkjet recording apparatus using the inkjet recording process according to claim 1.

6. The inkjet recording apparatus according to claim 5, comprising:
   a landing section where the actinic radiation-curable inkjet ink is landed on the recording medium;
   an irradiation section where the ink landed on the recording medium is irradiated with actinic radiation;
   a temperature-adjusting mechanism A; and
   a temperature-adjusting mechanism B, wherein:
   the temperature-adjusting mechanism A is configured such that a temperature of the actinic radiation-curable inkjet ink at the landing section is adjusted to be the ink temperature $T_2$ (° C.); and
   the temperature-adjusting mechanism B is configured such that a temperature of the actinic radiation-curable inkjet ink at the irradiation section is adjusted to be the ink temperature $T_3$ (° C.), and $T_2$ (° C.)−$T_3$ (° C.)>5° C.

7. The inkjet recording apparatus according to claim 6, wherein
the temperature-adjusting mechanism A and the temperature-adjusting mechanism B are discontinuously disposed.

* * * * *